United States Patent [19]

Knowles et al.

[11] Patent Number: 5,243,551

[45] Date of Patent: Sep. 7, 1993

[54] PROCESSOR SUITABLE FOR RECURSIVE COMPUTATIONS

[75] Inventors: Simon C. Knowles, Dover; John G. McWhirter, Worcestershire, both of England; John V. McCanny, Newtownards; Roger F. Woods, Belfast, both of Northern Ireland

[73] Assignee: The Secretary of State for Defence in Her Britannic Majesty's Government of the United Kingdom of Great Britain and Northern Ireland, London, England

[21] Appl. No.: 833,609

[22] Filed: Feb. 12, 1992

Related U.S. Application Data

[63] Continuation of Ser. No. 521,701, filed as PCT/GB89/00531 on May 17, 1989, abandoned.

[51] Int. Cl.$^5$ .............................................. G06F 7/38
[52] U.S. Cl. .............................. 364/750.5; 364/746.2
[58] Field of Search ............ 364/754, 757, 736, 750.5, 364/746.2, 724.17

[56] References Cited

U.S. PATENT DOCUMENTS

| | | | |
|---|---|---|---|
| 4,493,048 | 1/1985 | Kung et al. | 364/728.01 |
| 4,639,857 | 1/1987 | McCanny et al. | 364/754 |
| 4,686,645 | 8/1987 | McCanny et al. | 364/754 |
| 4,701,876 | 10/1987 | McCanny et al. | 364/728.01 |
| 4,777,614 | 10/1988 | Ward | 364/754 |
| 4,823,299 | 4/1989 | Chang et al. | 364/754 |
| 4,833,635 | 5/1989 | McCanny et al. | 364/728.01 |
| 4,864,528 | 9/1989 | Nishiyama et al. | 364/746.2 |
| 4,885,715 | 12/1989 | McCanny et al. | 364/728.01 |

OTHER PUBLICATIONS

R. F. Lyon, "Filters, An Integrated Digital Filter Subsystem", published by Addison-Wesley in 1985, pp. 253-262.
Bit Level Pipelining of Recursive Computations, J. V. McCanny et al, Lisbon Conference, Apr. 1988.
Bit-Level Systolic Arrays for IIR Filtering, S. C. Knowles et al, Systolic Array Conference, May 1988.
Efficient Bit-Level Systolic Arrays for Inner Product Computation, R. B. Urquhart et al, 645 G.E.C. Journal of Research 2 (1984), No. 1, Rugby, GB.
Systolic Matrix and Vector Multiplication Methods for Signal Processing R. B. Urquhart et al, IEEE Proceedings, vol. 131, Pt. F, No. 6, Oct., 1984.
An Approach to the Implementation of Digital Filters, Leland B. Jackson et al IEEE Transactions on Audio and Electroacoustics, vol. Au-16, No. 3, Sep. 1968.
Systolic Building Block for High Performance Recursive Filtering, R. F. Woods et al, pp. 1 through 4, Jun. 9, 1988, Helsinki.
IEEE Int. Conference on Acoustsics, Speech & Signal Processing, 1988 "Systolic IIR Filters with Bit Level Pipelining", Woods et al, Apr. 11, 1988.
Look-Ahead Computation, Improving Iteration Bound in Linear Recursions, Keshab Kumar Parhi et al, Depart. of Electrical Eng. & Computer Sciences, Copyright date of 1987.
On A Flexible Implementation of Digital Computer Arithmetic, A. Avizienis Jet Propulsion Laboratory, Calif. Institute of Tech., Pasadena, Calif., USA Aug. 27, 1962.

*Primary Examiner*—Long T. Nguyen
*Attorney, Agent, or Firm*—Nixon & Vanderhye

[57] ABSTRACT

A processor suitable for recursive computations is arranged to multiply successive input data words by a co-efficient word to produce results. It incorporates multiplier cells connected to form rows and columns. Each row is arranged to multiply a respective input data digit by the co-efficient. It begins with accumulator cells and continues with multiplier cells each arranged to multiply by an individual co-efficient digit and disposed in the row in descending order of digit significance. Columns other than the first column begin with a multiplier cell, and the higher significance columns terminate at respective accumulator cells. Any intervening multiplier cells are arranged in ascending order of multiplier digit significance. The processor employs radix 2 arithmetic. Each accumulator cell employs redundant radix 2 arithmetic, and each adds the highest significance transfer digit output of its row to at least three digits of equal and higher significance output from a preceding row. Operation of the multiplier and accumulator cells generates sum and transfer digits for output down and between columns in the direction of increasing digit significance in the case of transfer digits. An accumulator cell's computed digit of higher significance becomes the respective row's output result digit. Each result digit is recycled in redundant radix 2 form to provide an input data digit for all multiplier cells of a respective row selected in accordance with result digit significance.

13 Claims, 19 Drawing Sheets

$y = by' + u$

BASIC BUILDING BLOCK $y_n = b_1 y_{n-1} + u_n$

FIRST ORDER CONNECTION $y_n = b_1 y_{n-1} + b_2 y_{n-2} + u_n$

SECOND ORDER CONNECTION $y_n = b_1 y_{n-1} + b_2 y_{n-3} + b_3 y_{n-3} + u_n$

THIRD ORDER CONNECTION

PROCESSOR SUITABLE FOR RECURSIVE COMPUTATIONS

This is a continuation of application Ser. No. 07/521,701, filed as PCT/GB89/00531 on May 17, 1989, now abandoned.

BACKGROUND OF THE INVENTION

1. Field of the Invention

This invention relates to a processor suitable for recursive computations; i.e. a processor suitable for recycling output results to its input for the production of further results.

2. Discussion of Prior Art

Digital data processors for multiplication of numbers, vectors and matrices are available in the prior art, as are related devices for correlation and convolution. British Patent No. 2,106,287B equivalent to U.S. Pat. No. 4,639,857 to McCanny et al, (Reference (1)) describes bit-level systolic arrays for (a) number-number multiplication, (b) matrix-vector multiplication and (c) convolution. British Patent No. 2,144,245B equivalent to U.S. Pat. No. 4,686,645 to McCanny et al, (Reference (2)) describes a similar array for matrix-matrix multiplication, and British Patent No. 2,147,721B equivalent to U.S. Pat. No. 4,701,876 to McCanny et al (Reference (3)) relates to further developments for improvement of array efficiency. References (1) to (3) disclose arrays of logic cells with nearest neighbour row and column interconnections for bit propagation. FIG. 1 of Reference (1) shows additional diagonal connections between second nearest neighbour cells. Each cell is a gated full adder with single bit inputs. It generates the product of two multiplicand bits, adds the product to input sum and carry bits and produces new sum and carry bits. The sum bits accumulate in cascade down array columns (or diagonal in Reference (1) (FIG. 1). Multiplicand bits propagate along array rows. One-bit intercell latches activated by clock signals provide for bit storage and advance between cells, and ensure that the arrays are pipelined at the cell or bit level. Where appropriate, the arrays include column output accumulators arranged to sum separately computed contributions to output terms.

Published British Patent Application Nos. 2,168,509A equivalent to U.S. Pat. No. 4,777,614 to Ward, 2,187,579A equivalent to U.S. Pat. No. 4,885,715 to McCanny et al and 2,192,474A equivalent to U.S. Pat. No. 4,833,635 to McCanny et al (References (4), (5) and (6) respectively) demonstrate further bi-level systolic arrays which exhibit improved properties by the use of stationary multiplicative coefficients. Each coefficient remains associated with a respective cell, unlike References (1) to (3). However, data bits propagate along array rows for multiplication at gated full adder cells as before, and sum bits accumulate in cascade down array columns. Stationary array coefficients are also disclosed by Urquhart and Wood in the GEC Journal of Research, Vol 2, No. 1, 1984, pp 52-55 (Reference (7)) and Proc IEE Part F, Vol 131 No. 6, 1984, pp 623-31 (Reference (8)). These arrays also employ gated full adder cells with row and column interconnections.

One major area of application of bit-level systolic arrays is in the field of digital filters. Correlators and convolvers disclosed in References (1), (5) and (6) are examples of non-recursive, finite impulse response (FIR) filters. In digital signal processing, the correlation operation is defined by:

$$y_n = \sum_{i=0}^{N-1} a_i x_{n+i} \quad (1)$$

where:

$a_i (i=0$ to $N-1)$ represents a set of N correlation coefficients, $x_{n+i}$ is the $(n+i)$th input value, $y_n$ is the nth correlation result.

Successive values of $x_{n+i}$ form an input data stream, and successive $y_n$ values the filtered output stream.

Digital filters based on the prior art of References (1) to (8) are unsuitable for recursive filter applications, as the following analysis will show. These prior art arrays are pipelined at the bit level by clock-activated latches in the lines interconnecting neighbouring logic cells. This allows each array cell to compute a bit-level contribution to an output result while other cells are computing other contributions. Accordingly, data may be input on every clock cycle of operation without waiting for successive results to emerge from the array. Furthermore, the operating speed is not governed by the time taken for the whole array to compute a result. It is governed by the maximum clock rate of the latches associated with a single logic cell, which is much greater. However, against this, it is a basic feature of prior art systolic arrays that there is a time delay between data input and result output. In a typical case such as Reference (5), one row of logic cells is required per multiplicative coefficient in a coefficient set for convolution or correlation. In addition, an array output accumulator may be required to sum separately computed contributions to individual output terms.

There is typically a delay of one clock cycle per row for arrays accumulating results down columns. To this must be added any output accumulator delay. In the case of a digital filter based on the Reference (5) bit-serial data input device, an N-point convolution or correlation with N p-bit coefficients provides a delay of $N+2(p-1)$ clock cycles between input of a data bit and output of a result bit. Furthermore, for output results q bits in length, there is a delay of $N+2(p-1)+(q-1)$ clock cycles between initiation of data input and output of the final bit of a result from the output accumulator. In the case of a 16-point convolution with 8-bit coefficients and data, which produces 20-bit results, the delay will be 49 clock cycles. If the array is clocked at 5 MHz, the delay is about 10 microseconds, and it is referred to as the "latency" of the processor. It does not give rise to difficulty in the case of FIR filters, since it merely means that there is an insignificant delay between initiation of data input and that of result output. Thereafter, input and output proceed at the same rate; i.e. input is received and output is generated on each clock cycle.

However, the latency of prior art digital processors gives rise to difficulty in the area of recursive processing, as required in infinite impulse response (IIR) filters. The simplest form of IIR filter is that where the output depends both on the input and on an earlier output. It is known as a "first-order section". The computation can be expressed in the form:

$$y_n = a_0 x_n + a_1 x_{n-1} + b_1 y_{n-1} \quad (2)$$

where $x_{n-1}$ and $x_n$ are successive data values in a continuously sampled stream, $a_0$, $a_1$ and $b_1$ are coefficients determining the filter response function, and $y_{n-1}$ and $y_n$ are successive output results.

Equation (2) may be rewritten:

$$y_n = u_n + b_1 y_{n-1} \qquad (3)$$

where $$u_n = a_0 x_n + a_1 x_{n-1} \qquad (4)$$

Equation (3) demonstrates that $y_n$ is the sum of a non-recursive term $u_n$ (depending only on input data) and a recursive term arising from the immediately preceding result $y_{n-1}$. This can be rewritten to express $y_n$ in terms of $y_{n-k}$ ($k=2, 3 \ldots$) if required.

Any processor arranged to implement Equation (3) requires access to $y_{n-1}$ (or an earlier result) in order to compute $y_n$. Accordingly the processor must compute and output $u_{n-1}$ before beginning the computation of $y_n$. The characteristics of prior art processors now become much more serious, since their latency interval of many clock cycles must intervene between the computation of each pair of successive results. Instead of producing a new result every clock cycle, results are therefore spaced by the latency interval which may be 50 or more clock cycles. A latency of 50 cycles in a parallel recursive computation corresponds to the processor being only 2% efficient, or alternatively having an operating rate which is 1/50th that of a similar non-recursive processor.

The construction of digital filters has been discussed by R. F. Lyon in VLSI Signal Processing, a Bit Serial Approach, P B Denyer and D Renshaw, Addison Wesley, pp 253-262, 1985. It is also described by Jackson et al in IEEE Trans on Audio and Electroacoustics, Vol AU-16, No. 3 pp 413-442, 1968. Neither of these addresses the problem of latency and inefficiency in IIR filters.

The latency problem is discussed by Parhi and Messerschmitt in ICASSP 87, pp 1855-1858. The basic approach is to rearrange the algorithm expressed by Equations (3) and (4) above so that $y_n$ becomes expressed in terms of $y_{n-k}$. They point out that the latency problem is inherent in recursive algorithms, but describe how it can be tolerated by a so-called "look-ahead" approach. In essence, this amounts to coping with latency by arranging the algorithm to employ as a recursive input whatever output is available. A parallel processor with a latency of k clock cycles will have $y_{n-k}$ available at its output when $u_n$ in Equation (3) is to be input. Since Equation (4) gives $$y_n = a_0 x_n + a_1 x_{n-1} + b_1 y_{n-1}$$

then $$y_{n-1} = a_0 x_{n-1} + a_1 x_{n-2} + b_1 y_{n-2} \qquad (5)$$

and $$y_{n-2} = a_0 x_{n-2} + a_1 x_{n-3} + b_1 y_{n-3} \qquad (7)$$

Expressing $y_n$ in terms of $y_{n-3}$:

$$y_n = a_0 x_n + a_1 x_{n-1} + b_1 [a_0 x_{n-1} + a_1 x_{n-2} + b_1 \{a_0 x_{n-2} + a_1 x_{n-3} + b_1 y_{n-3}\}] \qquad (7)$$

By induction, $y_n$ in terms of $y_{n-k}$ is given by $$y_n = \sum_{i=0}^{k-1} b_1^i [a_0 x_{n-i} + a_1 x_{n-i-1}] + b_1^k y_{n-k} \qquad (8)$$

The right hand side of Equation (8) consists of a non-recursive summation term together with a recursive term consisting of the product of $y_{n-k}$ and a coefficient. Parhi and Messerschmitt have therefore dealt with the latency problem by choosing the feedback term $y_{n-k}$ to be sufficiently early in the output $y_n$ series for latency to be accommodated. However, the price they pay for this approach is the requirement to evaluate the Equation (8) summation term. This requires the addition of k terms, each of which involves a respective coefficient $b_1^i$ multiplying the sum of two products of multibit numbers. This rapidly becomes unmanageable as k increases, since each $a_0 x_{n-i}$ alone would require a processing array as described in Reference (1). The Parhi et al approach consequently deals with latency, but only at the price of requiring an undesirably large non-recursive processor. For example, if k is 50 as for a typical prior art processor, the procedure requires the summation of fifty multiply twice, add, multiply operations.

SUMMMARY OF THE INVENTION

It is an object of the present invention to provide an alternative form of processor which is suitable inter alia for recursive computations.

The present invention provides a processor for performing multiplication operations comprising multiplying input terms by a coefficient to form products, the processor including an array of multiplier cells arranged to multiply by coefficient digits and to add product digits arising from multiplication, together with accumulating means arranged to add array output digits, characterised in that the accumulating means is arranged to compute output result digits most significant digit first and in descending order of digit significance in accordance with a redundant arithmetic scheme.

The invention provides the advantage that it is ideally suited to inter alia recursive applications such as infinite impulse response filters. The most significant digit first accumulating means output allows result digits to be recycled via feedback connections as subsequent processor inputs as soon as such digits are produced. As will be described later, this greatly reduces the latency interval within the feedback or recursion loop. In conventional binary electronic logic employing non-redundant arithmetic, results are computed lest significant digit (bit) first. Although the processor of the invention is intended primarily for recursive applications, it is also appropriate for processing signals from devices such as analogue to digital converters; such devices implement a successive approximately procedure to produce digits in descending order of significance.

In a preferred embodiment, the processor of the invention preferably includes multiplier cells connected to form rows each arranged to multiply by at least the more significant coefficient digits and a respective feedback line connecting each row to a respective accumulating means result digit output as a common multiplicand input for multiplier cells of that row. In this embodiment, the processor also includes means for adding second input terms to multiplier cell products. This provides for execution of the IIR filter computation of equation (2).

The processor of the invention may incorporate accumulating means and multiplier cells connected to form rows and columns of the array, characterised in that:
(a) each row containing multiplier cells is arranged to multiply by at least the more significant coefficients digits with multiplier coefficient digit significance diminishing along the row;
(b) the columns are associated with digits of respective significances, and columns containing multiplier cells exhibit multiplier coefficient digit significance increasing down the columns;
(c) the array is arranged to add second input terms to products by at least on of the following means:
  (i) addition functions for first row multiplier cells,
  (ii) addition functions for multiplier cells associated with most significant coefficient digits;
(d) intercell connections are arranged for movement down columns of lower significance digits generated in the accumulating means and multiplier cells and for movement to neighbouring higher significance columns where available of like generated transfer digits;
(e) clock-activated latches are arranged in intercell connections between column neighbour accumulating means parts and multiplier cells to provide for storage and advance of digits from row to row;
(f) multiplier cells in at least the second and subsequent rows have addition functions for adding digits received from respective column neighbours to multiplication product digits and digits received from respective neighbouring columns where available; and
(g) the columns terminate in respective accumulating means parts arranged to generate respective output result digits in accordance with a redundant arithmetic scheme.

The multiplier cells are preferably arranged to accept input transfer digits for addition at a later computational stage to that in which each such digit was generated. This has the effect that transfer digit propagation and row settling time are reduced, and it increases processor operating speed. Multiplier cells associated with coefficient digits of lesser significance may be connected to pass transfer digits between adjacent rows in accordance with a carry-save structure. This enables multiplier cells to be arranged to operate in accordance with conventional non-redundant binary arithmetic.

Two or more processors of the invention may be arranged in cascade with one processor having accumulating means outputs connected to multiplicand inputs of both or all processors as appropriate, and the other processor or processors having accumulating means outputs connected to additive inputs of the other or a respective other processor. This provides for configuration of the invention to provide second or higher order infinite impulse response filter circuits.

Processors of the invention may be implemented with circuitry based on any arithmetic scheme provided that the accumulating means is arranged to generate output digits in descending order of digit significance in accordance with a redundant arithmetic scheme. Examples of the invention will be described in which both the multiplier cells and the accumulating means are based on signed digit number representations involving radix 4 or radix 2. Further examples employ radix 2 arithmetic, and reduce the degree to which redundant arithmetic is employed, and a final example restricts redundant arithmetic to the accumulating means and feedback digits.

A further consequence and advantage of the invention is that, in computations requiring accuracy only to digits of higher significance, circuitry devoted to lower significance computations may be omitted, unlike prior art devices. Each succeeding row of a processor configured in this way has progressively fewer processing elements, which leads to circuitry savings compared to the prior art.

BRIEF DESCRIPTION OF THE DRAWINGS

In order that the invention might be more fully understood, embodiments thereof will now be described, by way of example only, with reference to the accompanying drawings, in which.

DETAILED DESCRIPTION OF PREFERRED EMBODIMENTS

Figure 1:
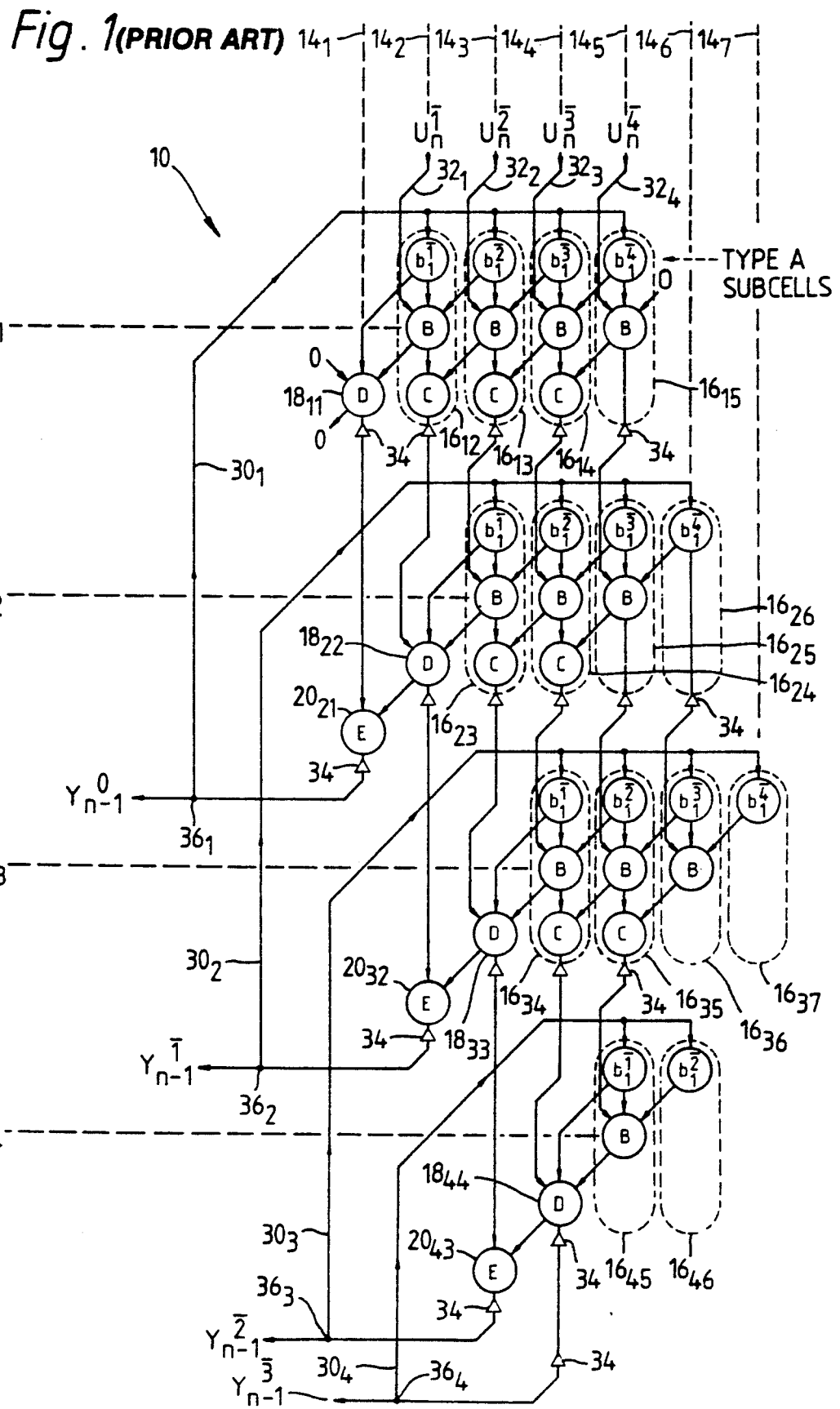
FIG. 1 is a schematic drawing of a processor arranged for recursive computations with radix 4 arithmetic.

Referring to FIG. 1, there is shown in schematic form a processor 10. The processor 10 incorporates processing cells in four rows $12_1$ to $12_4$ indicated by horizontal chain lines. The processing cells are of varying kinds to be referenced later. Successive rows $12_2$ to $12_4$ are right shifted compared to respective rows $12_1$ to $12_3$, immediately above, and this structure defines cells in seven columns $14_1$ to $14_7$ indicated by vertical chain lines. In the following description, cell location in the processor 10 will be identified by indices applied to corresponding reference numerals; i.e. $X_{ij}$ would indicate an ith row, jth column cell of type X, where X is a reference numeral.

The row and column structure of the processor 10 is illustrated to clarify mode of operation to be described later. In particular, digits generated by multiplication or addition and which pass down any column (product and sum digits) are of constant significance. Each column is therefore associated with a respective digit significance, and this significance diminishes to the right in FIG. 1. The jth column $14_j$ is associated with digit significance $(1-j)$ where $j=1$ to 7. Transfer digits (related to binary carry bits) generated in a column are one level higher in digit significance, i.e. $2-j$ where $j=2$ to 7, and are consequently passed to the left to a respective neighbouring column. It will be appreciated that, in a practical integrated circuit embodiment, the location of individual cells is a matter of design convenience, and that rows and columns need not necessarily be straight.

The processor 10 comprises three types of cell 16, 18 and 20, of which 16 is a composite such as first row, third column cell $16_{13}$ indicated within dotted lines. The cell $16_{13}$ incorporates three subcells, types A, B and C, which have differing functions. The subcell structure is shown to assist later analysis of mode of operation. Not all cells 16 incorporate all three subcells A, B and C. In a practical circuit, each cell will be an array of transistors. However, following the prior art, they are treated and described as distinct cells for the purposes of this specification, although in practice they may be areas of an integrated circuit chip.

The last one or two cells 16 on the right hand end of each row lack type C or type B and C subcells. The purpose of this representation is to illustrate an important advantage. Unlike the prior art it computes output digits in descending order of significance, the most significant digit appearing first as will be described later. Accordingly, when accuracy to a given number of digits is required, the processor 10 need only incorporate those cells and part of cells which contribute to those digits. Other cells are omitted, which gives rise to the apparently incomplete processor structure illustrated.

All four rows $12_1$ to $12_4$ include respective type D cells $18_{11}$ and $18_{22}$ to $18_{44}$. The second to fourth rows $12_2$ to $12_4$ include respective type E cells $20_{21}$ to $20_{43}$.

Figure 2:
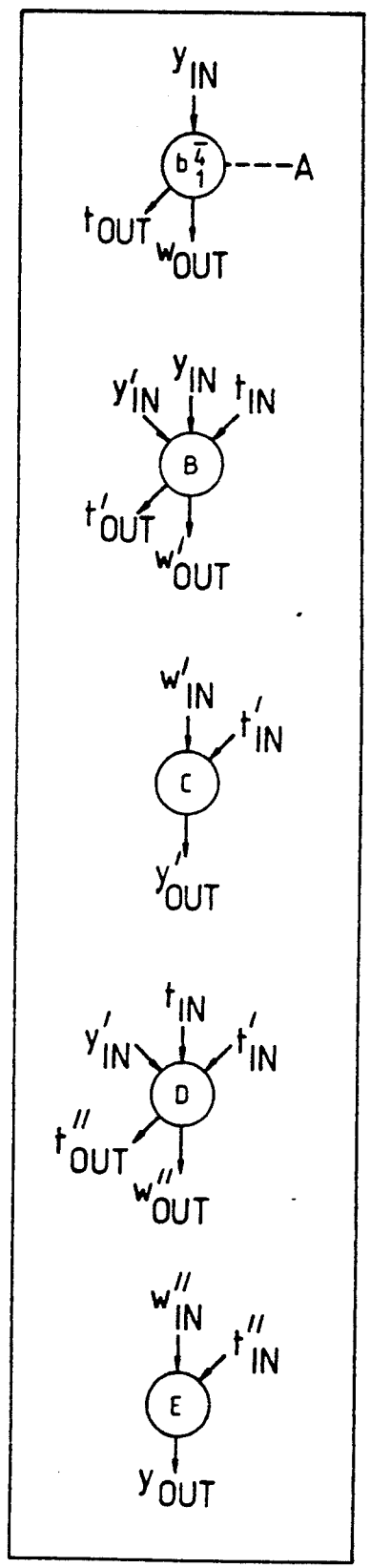
FIG. 2 illustrates input and output terms for cells in the FIG. 1 processor.

Referring now also to FIG. 2, the five cell and subcell types A to E are illustrated with labelled input and output digits. The type A subcell is a multiplier. It receives an input digit $y_{in}$ from vertically above, and multiplies this by a single digit coefficient $b_1^m(m=1, 2, 3$ or $4)$ with which it is labelled. It provides an intermediate sum output digit $w_{out}$ vertically below, and a transfer digit $t_{out}$ of relatively higher significance below and to the left. The type B subcell is equivalent in arithmetic terms to the type D cell; both are full adders, but they perform different roles in the processor 10. The expression "full adder" is used by analogy with binary logic to describe a three input device, a "half adder" being a two input device. Both types B and D receive three inputs from above, and add them to produce intermediate sum and transfer digits to be passed on below and below left respectively. However, type B has inputs $y_{in}'$, and $w_{in}$ and $t_{in}$ together with outputs $w_{out}'$ and $t_{out}'$, whereas the equivalents for type D are $y_{in}'$, $t_{in}$ and $t_{in}'$ together with $t_{out}''$ and $w_{out}''$. The digit nomenclature is intended to indicate the progress of a computation in the processor 10. Thus an unprimed digit arises prior to a primed digit, which in turn arises prior to a doubly primed digit.

Moreover, a digit such as $t_{out}'$ from a type B subcell is $t_{in}'$ for a respective type D cell or type C subcell connected thereto. The nomenclature accordingly assists analysis to be given later.

The A subcells in each cell 16 receive multiplicand inputs recycled via feedback lines $30_1$ to $30_4$ connected to respective rows $12_1$ to $12_4$. This generates product and transfer digits $w_{out}$ and $t_{out}$, of which $w_{out}$ becomes a vertical input to the associated B subcell immediately below; $t_{out}$ passes diagonally down to the neighbouring B subcell where available, or to a D cell otherwise. Each B subcell also receives a transfer digit output from a right hand neighboring A subcell and an input from above. For first row cells 16, this last input is $u_n^1$ to $u_n^4$ on lines $32_1$ to $32_4$. For second, third and fourth row processing cells 16 containing B subcells, this input is received from the like cell in the same column of the row immediately above. Signals pass between rows i.e. down columns) via clock-activated latches or storing devices indicated by triangles such as 34, all latches being clocked in synchronism.

Each B subcell adds its three inputs together to produce output sum and transfer digits $w_{out}'$ and $t_{out}'$. The sum $w_{out}'$ passes to the respective C subcell if available. The transfer digit $t_{out}'$ passes diagonally down to a left hand neighbouring C subcell where available, or to a D cell otherwise. Each C subcell adds its two inputs from above and above right to produce a single digit output. This output passes via a latch 34 to a B subcell or a D cell in the same column and in the row immediately below. Like the equivalent E cells, each C subcell is a half adder without any transfer digit output.

Each D cell adds its three inputs from above, above upper right and above lower right ($y_{in}'$, $t_{in}$, $t_{in}'$) to produce intermediate sum and transfer digits $w_{out}''$ and $t_{out}''$. The first row D cell has one input permanently zero, and for this cell $t_{out}'$ must also be zero. It could in fact be replaced by a half adder type E cell. Each D cell provides $w_{out}''$ as a $w_{in}''$ input to the E cell of the row below where available, or to a lowermost array output $36_4$ via two latches in series in the case of the last row D cell. Transfer digits $t_{out}''$ from second to fourth row D cells pass as diagonal inputs to respect like row E cells for addition to $w_{out}''$ from previous row D cells. Each E cell output is a single digit $y_{out}$ which passes via a latch 34 to a respective array output $36_1$ to $36_3$. The array outputs $36_1$ to $36_4$ are connected to respective feedback lines $30_1$ to $30_4$.

This processor 10 operates on totally different principles as compared to prior art devices. They employ conventional binary arithmetic, in which successive digits (bits in binary arithmetic) are computed in ascending order of significance. In particular, least significant bits are computed first and carry bits propagate to computations of higher significance. In consequence, the greater the significance or importance of a digit, the longer it takes to emerge in prior art devices. Furthermore, the value of the least significant digit affects those of higher significance; e.g. adding 0001 to 0111 produces 1000 in binary arithmetic. If the least significant bit is not computed to reduce processor size and processing time, the most significant bit is wrong in this example. The processor 10 operates in accordance with so-called redundant number arithmetic based on signed digit number representations (SDNRs). These differ from conventional arithmetic in that any digit may have a positive or a negative value, and also in that there is more than one way of representing a number. Furthermore, there is normally a choice of digit sets. Before discussing the way in which the processor 10 executes a computation, this form of arithmetic will be discussed.

In conventional radix 10 (decimal) arithmetic, the digit set is 0 to 9 and the digits are all of the same sign. The processor 10 is constructed to operate with an SDNR of radix 4 and digit sets such as $-3, -2, -1, 0, 1, 2, 3$. This is known as the maximally redundant set. It is also possible to employ other digit sets with this radix such as the minimally redundant set $-2$ to 2. The redundancy aspect is exemplified by the decimal number 15, which in the maximally redundant radix 4 digit set is $(1,0,-1)$, $(0,3,3)$ or $(1,-3,0,-1)$ etc. Generally speaking, for a radix r the maximally and minimally redundant sets have $(2r-1)$ and $(r+1)$ digits respectively. For radix 2 these are the same, a set of three digits 1, 0 and $-1$.

The processor 10 operates on fractional quantities, so that recursion or repeated feedback from output to input does not produce overflow. Thus inputs $u_n^1$ to $u_n^4$ (the digits of the nth value of u) at $32_1$ to $32_4$ have digit significance of $4^{-1}$ to $4^{-4}$ respectively, i.e. ¼ to 1/256. Similarly, the $(n-1)$th result output digits $y_{n-1}^0$ to $y_{n-1}^3$ at $36_1$ to $36_4$ have significance $4^0$ to $4^{-3}$ respectively, or 1 to 1/64. In addition, the digits $b_1^{\bar{1}}$ to $b_1^{\bar{4}}$ of the multiplying coefficient $b_1$ have the same significance as $u_n^{\bar{1}}$ to $u_n^{\bar{4}}$. In consequence, each column $14_1$ to $14_7$ of the processor 10 is of constant digit significance, and this significance reduces by one per column from left to right. In cell $16_{13}$ for example, subcell A multiplies an input $y_{n-1}^0$ by $b_1^{\bar{2}}$ to produce a lower significance digit $w_{out}$ to be passed on in the same column, together with a higher significance digit $t_{out}$ to be passed to the left. The digits $w_{out}$ and $t_{out}$ have significances 2 and 1 respectively. The columns $14_1$ to $14_7$ therefore correspond to digit significances 0 to 6 respectively. The processor 10 is designed for values of $b_1$ in the range $-0.2222$ to $+0.2222$ in radix 4, equivalent approximately to $-0.66$ to $+0.66$ in decimal.

Individual digits of the kinds y and u may take any value in the maximally redundant radix set $(-3$ to $3)$. However, digits of the kinds $b_1$ and w are restricted in this example of the invention to the minimally redundant radix 4 set $(-2$ to $2)$. Moreover, transfer digits of the kind t are restricted to values $(-1$ to $1)$. These digit value restrictions apply irrespective of whether or not the relevant digit is primed or carries a subscript.

Having clarified the arithmetic rules implemented by the processor 10, its operation will now be discussed in more detail. FIG. 1 illustrates the first row $12_1$ of the processor 10 receiving input of the four digits $u_n^{\bar{1}}$ to $u_n^{\bar{4}}$ representing the nth non-recursive input $u_n$. Each row $12_m$ (m=1 to 4) is also receiving a respective feedback digit $y_{n-1}^{m-1}$ generated in the preceding or $(n-1)$th computation. The processor 10 is designed to implement the first order IIR filter section relation given in Equation (3) and repeated below for convenience:

$$y_n = u_n + b_1 y_{n-1} \quad (3)$$

The first row $12_1$ of the processor 10 implements multiplication of the most significant digit $y_{n-1}^0$ of the $(n-1)$th output result $y_{n-1}$ by the coefficient $b_1$ having digits $b_1^{\bar{1}}$ to $b_1^{\bar{4}}$. Moreover, the first row $12_1$ provides for addition of the non-recursive term $u_n$ with digits $u_n^{\bar{1}}$ to $u_n^{\bar{4}}$. The first step in this row is for each type A sub-cell to receive input of $y_{n-1}^0$ and multiply it by the respective digit $b_1^m$ (m=1 to 4). Processing cell $16_{13}$ within dotted lines will be considered first. Its multiplication operation involves a digit $y_{n-1}^0$ in the range $(-3$ to $3)$ and a digit $b_1^{\bar{2}}$ in the range $(-2$ to $2)$. The produce is therefore in the range $(-6$ to $6)$. However, the allowed range for $w_{out}$ from a type A subcell is $(-2$ to $2)$, so a transfer digit $t_{out}$ is generated which is one level higher in significance. This is expressed by:

$$w_{out} + rt_{out} = b_1^{\bar{m}} \cdot y_{in} \quad (9)$$

where r is the radix and m is the multiplier digit significance; r=4, and m=2 in the present case.

Since r=4 and $t_{out}=\pm 1$ or 0, $rt_{out}=\pm 4$ or 0. Values of the product $b_1^{\bar{m}} \cdot y_{in}$ from $-2$ to 2 are expressed by $t_{out}=0$ and $w_{out}=b_1^{\bar{m}} \cdot y_{in}$. Values $\pm 3$ of the product are expressed by $w_{out}=\pm 1$ and $t_{out}=\pm 1$. Values $\pm 4$ to $\pm 6$ are expressed by $w_{out}=\pm 0$ to $\pm 2$ and $t_{out}=\pm 1$. All possible products of the A subcell multiplication are therefore accommodated within the digit limits previously given.

The subcell of cell $16_{13}$ passes the transfer digit $t_{out}$ diagonally down to the left hand neighbouring B subcell of cell $16_{12}$, where it becomes $t_{in}$. It is added to $u_n^{\bar{1}}$ and to $w_{out}$ of the A subcell of cell $16_{12}$, with which it shares like digit significance. These three digits have value ranges $(-1$ to $1)$, $(-3$ to $3)$ and $(-2$ to $2)$ respectively. Their sum consequently lies in the range $(-6$ to $6)$, which is the same as the output range from a type A multiplier subcell. It can accordingly be accommodated by similar output digits $w_{out}'$ and $t_{out}'$ in ranges $(-2$ to $2)$ and $(=1$ to $1)$ respectively. The B subcell function is expressed by $$w_{out}' + rt_{out}' = y_{in}' + t_{in} + w_{in} \quad (10)$$

($y_{in}'$) is replaced by $u_{in}$ for top row B subcells.)

The sum digit $w_{out}'$ from the B subcell passes to the associated C subcell where available, which has the function $$y_{out}' = w_{in}' + t_{in}'$$

Of these, $t_{in}'$ arises from a neighbouring B subcell, and $y_{out}'$ passes as input to the row below.

The transfer digit $t_{out}'$ of the B subcell passes to the adjoining column's D cell $18_{11}$, where it is added to the multiplier or A subcell transfer digit $t_{out}$. Other D cells $18_{22}$ to $18_{44}$ receive input of $y_{out}'$ (range $-3$ to $3$) from a C subcell in the row above. Cell $18_{11}$ has no row above however, and its $y_{in}'$ input is set permanently to zero. Moreover, since it is adding two transfer digits both in the range $-1$ to 1, its output is in the range $-2$ to 2. Consequently, its transfer digit output $t_{out}''$ is therefore permanently zero, and does not require to be connected. Hence cell $18_{11}$ has a $y_{in}'$ input and a $t_{out}''$ output which are unconnected. More generally, for other D cells $18_{22}$ to $18_{44}$, the function is given by $$w_{out}'' + rt_{out}'' = y_{in}' + t_{in} + t_{in}' \quad (11)$$

Equation (11) is similar to Equation (10); $y_{in}'$ is in the range $(-3$ to $3)$, and the equivalent for $t_{in}$ and $t_{in}'$ is $(-1$ to $1)$. The combined range is $(-5$ to $5)$, which can be accommodated by r=4, $t_{out}''$ in the range $(-1$ to $1)$ and $w_{out}''$ in the range $(-2$ to $2)$ as previously described regarding B subcell.

The D cell $18_{11}$ provides the sum $w_{out}''$ of both first row, second column transfer digits $t_{in}$ and $t_{in}'$ as an input $w_{in}''$ to the second row E cell $20_{21}$. This E cell also receives input of a transfer digit $t_{in}''$ generated as $t_{out}''$ from the second row D cell $18_{22}$. The inputs to E cell $20_{21}$ are both of digit significance 0, since both are one level higher than that of column $14_2$; i.e. E cell $20_{21}$ is summing $w_{out}''$ (which arose from two first row, second column transfer bits) with a second row, second column transfer bit $t_{out}''$. Since $w_{out}''$ and $t_{out}''$ are in the ranges ($-2$ to 2) and ($-1$ to 1) respectively, E cell $20_{21}$ produces their sum $y_{out}$ in the range ($-3$ to 3). This involves no digit significance increase, since the range is acceptable for terms of type y. The sum $y_{out}$ was computed inter alia from most significant digits $y_{n-1}{}^0$ and $u_n{}^1$, and forms the most significant digit $y_n{}^0$ of the result $y_n$ succeeding that illustrated in FIG. 1. The computation producing $y_n{}^0$ passes through the two left hand first row latches 34 in parallel, and subsequently through the left hand second row latch 34 under E cell $20_{21}$; $y_n{}^o$ accordingly takes two clock cycles to emerge from the processor 10 after the preceding $y_{n-1}{}^o$ is generated.

The digit $y_n{}^1$ of second highest significance of the succeeding result $y_n$ is formed similarly. The equivalent preceding digit $y_{n-1}{}^1$ is fed back from the third row output $36_2$ via the line $30_2$ to each of the second row A subcells of cells $16_{23}$ to $16_{26}$. It is formed one clock cycle later than $y_{n-1}{}^o$, and is one level lower in digit significance. Accordingly, its multiplication by $b_1{}^1$ to be $b_1{}^4$ will yield products one level lower than those involving like multiplying coefficients in row 12, above. This is accommodated as shown in FIG. 1 by the shift of row $12_2$ by one column to the right relative to row $12_1$.

The computation of $y_n{}^1$ is similar to that of $y_n{}^o$, and so it will be described in outline only. It is produced as $y_{out}$ from third row E cell $20_{32}$, and is the sum of the transfer digit $t_{out}''$ from the third row D cell $18_{33}$ and the digit $w_{out}''$ from the second row D cell $18_{22}$. Of these, cell $18_{22}$ sums the lower order digit $y_{out}'$ from its column neighbour $16_{12}$ in the row above with transfer digits from its row neighbour $16_{23}$. In turn, cell $16_{23}$ receives two transfer digits from its neighbour $16_{24}$. The other input to third row E cell $20_{32}$ from its row neighbour D cell $18_{33}$ arises from the C subcell of cell $16_{23}$ in the row above and transfer digits from like row member $16_{34}$. In turn, cell $16_{23}$ receives input from its column neighbour C subcell in the row above.

The digit $y_n{}^2$ third in order of significance is formed similarly to $y_n{}^1$, except that rows and columns further down and to the right become involved in computation. It is output from fourth row E cell $20_{43}$. As has been discussed, its value can be affected only by outputs from cells up to three steps to the right in row $12_4$ and up to four steps to the right in row $12_3$. Of these, subcells B and C (not shown) of cells $16_{37}$ and $18_{46}$ and subcells C (not shown) of cells $16_{36}$ and $18_{45}$ cannot contribute to $y_n{}^2$ and are omitted from the processor 10. This omission does not affect the value of $y_n{}^2$, or indeed those of $y_n{}^o$ and $y_n{}^1$, which are correctly calculated. The processor 10 therefore contains the minimum of circuitry necessary to calculate the three highest significance result digits.

The least significant result digit $y_n{}^3$ is derived as $w_{out}''$ from fourth row D cell $18_{44}$. It passes via two latches 34 to the lowermost processor output $36_4$. It may be inaccurate by 1, i.e. if its calculated value is x in the range ($-2$ to 2), its actual value will be $x-1$, x or $x+1$. This corresponds to a truncation error in the final result. The lowermost latch 34 in FIG. 1 is the only remaining item of a fifth row of cells, and corresponds to a latch following a type E cell output. It acts as a single digit accumulating means, there being no row neighbours generating other digits.

The foregoing discussion of mode of operation has been restricted to details of computation. Timing of processor operation will now be described. Initially, the processor outputs $36_1$ to $36_4$ are zero. The digits $u_1{}^1$ to $u_1{}^4$ to $u_1$, the first non-recursive input term, are fed to the processor's first row B subcells. Time is subsequently allowed for the first row cells to settle to final states. The processor latches (e.g. 34) are then clocked in synchronism by a common system clock (not shown) connected thereto. This advances the first row cell outputs to the second row for a second cycle of computation. After the settling time interval, the latches 34 are clocked once more. This advances the most significant digit $y_1{}^0$ of the first result $y_1$ from E cell $20_{21}$ to the uppermost processor output $36_1$, where it is fed back to first row cells. In addition, intermediate results from other second row cells pass via latches 34 to third row cells. At the same time, i.e. after two clock cycles, the digits $u_2{}^1$ to $u_2{}^4$ of the second non-recursive term $u_2$ are input to first row cells. The processor latches are clocked a third time to advance first row outputs to second row cells. This also brings the second most significant digit $y_1{}^1$ to the second row output $36_2$, which is one cycle later than the appearance of $y_1{}^0$ at $36_1$. On its appearance at $36_2$, $y_1{}^1$ is fed back as an input to second row cells.

The latches 34 continue to be clocked in synchronism, with successive values of $u_n$ being input to the first processor row $12_1$ every two clock cycles. Similarly, successive values of output digits $y_n{}^m$ emerge $(m+2)$ clock cycles after, where $m=0$ to 3; i.e. there is a one clock cycle delay between emergence of digits differing in significant by one. In general, the digit $y_n{}^m$ of mth significance of the nth result $y_n$ appears at output $36_{m+1}$ after $(2n+m)$ clock cycles, and is fed back for input to processor row $12_{m+1}$. This illustrates an important feature of the processor 10, that each output digit $y_n{}^m$ is recycled for subsequent use as soon as it is generated. Furthermore, as has been said, there is a delay of two clock cycles between input of $u_n$ and output of $y_n{}^o$, but this is independent of input or output word length (number of digits per item $u_n$ or $y_n$). Successive values of each of $y_n{}^o$ to $y_n{}^3$ appear every two clock cycles, so the processor 10 is 50% efficient. The efficiency may be improved to 100% when two independent operations are to be executed, since they may be interleaved and computed on alternate cycles. The input non-recursive term would be $u_n$ on even clock cycles and $u_n{}^*$ say on odd clock cycles. These efficiency values of 50% or 100% compare very favourably with much lower prior art values involving digital processors calculating least significant digits (bits) first. Efficiency may also be improved by combining the functions of two neighbouring rows into that of a single row. Alternatively, $y_n$ may be expressed in terms of $y_{n-2}$ as described with reference to Equations (4) to (7).

The foregoing analysis demonstrates that the processor 10 executes the recursive first order IIR filter section computation given by Equation (3) as $$y_n = u_n + b_1 y_{n-1} \qquad (3)$$

provided that $u_n$ is computed separately, where:

$$u_n = a_0 x_n + a_1 x_{n-1} \qquad (4)$$

Here $x_n$ represents a continuous data stream and $a_0$, $a_1$ and $b_1$ are coefficients determining the filter frequency response; $u_n$ may be calculated repeatedly separately from the processor 10, and employing the data stream $x_n$ as input to simple prior art multipliers described for example in British Patent No. 2,106,287B (Reference 1). It is non-recursive, so that feedback or recursion loop delay problems do not arise. Moreover, it involves only two multiplication operations followed by addition.

The processor 10 incorporates latches 34 between adjacent rows 12 but not between adjacent columns 14. It is in fact possible to introduce equivalent latches between columns, provided that inputs to first row cells have relative delays increasing with decreasing digit significance. However analysis of this configuration shows that the effect is to slow down processor operation. Prior art devices normally employ latches between both row and column neighbour cells.

The processor 10 accepts successive input terms $u_n$ with digits $u_n^m$ (m=1 to 4) supplies in synchronism to first row multiplier cells $16_{12}$ to $16_{15}$. It accepts an input and produces an output every two latch or clock activation cycles. It produces output terms $y_n$ with digits $y_n^m$ (m=0 to 3) (2+m) clock cycles after input of $u_n$; i.e. the most significant digit $y_n^o$ arrives after two clock cycles and successive digits are increasingly more delayed. This is referred to in the art of array processors as a "temporal skew". The processor 10 is therefore characterised by synchronous input but temporally skewed output. It is more convenient in some circumstances to provide a processor characterised by input and output of like temporal skew to facilitate connection in cascade. Moreover, the processor 10 is restricted as has been said to values of coefficient digits $|b_1^1|$ etc not greater than 2. The maximum value of the coefficient $b_1$ is therefore 0.2222 in radix 4, or about 0.66 when converted to radix 10. It may be convenient to employ larger values of $b_1$ to provide more freedom of choice of filter response characteristics. The penalty for this is that input data values may then produce overflow.

Figure 3A:
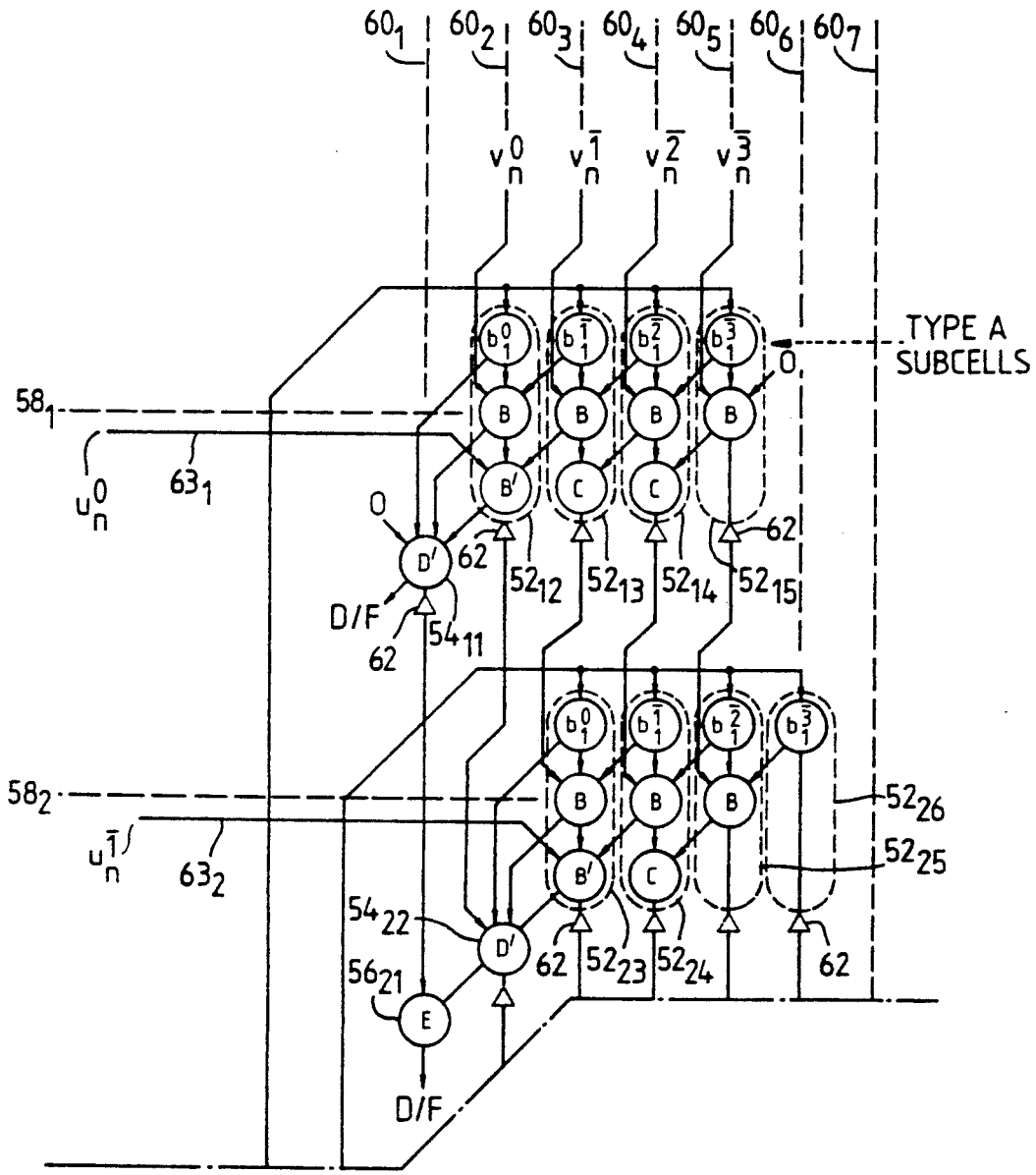
FIGS. 3A and 3B show in two part form a processor.
Figure 3B:
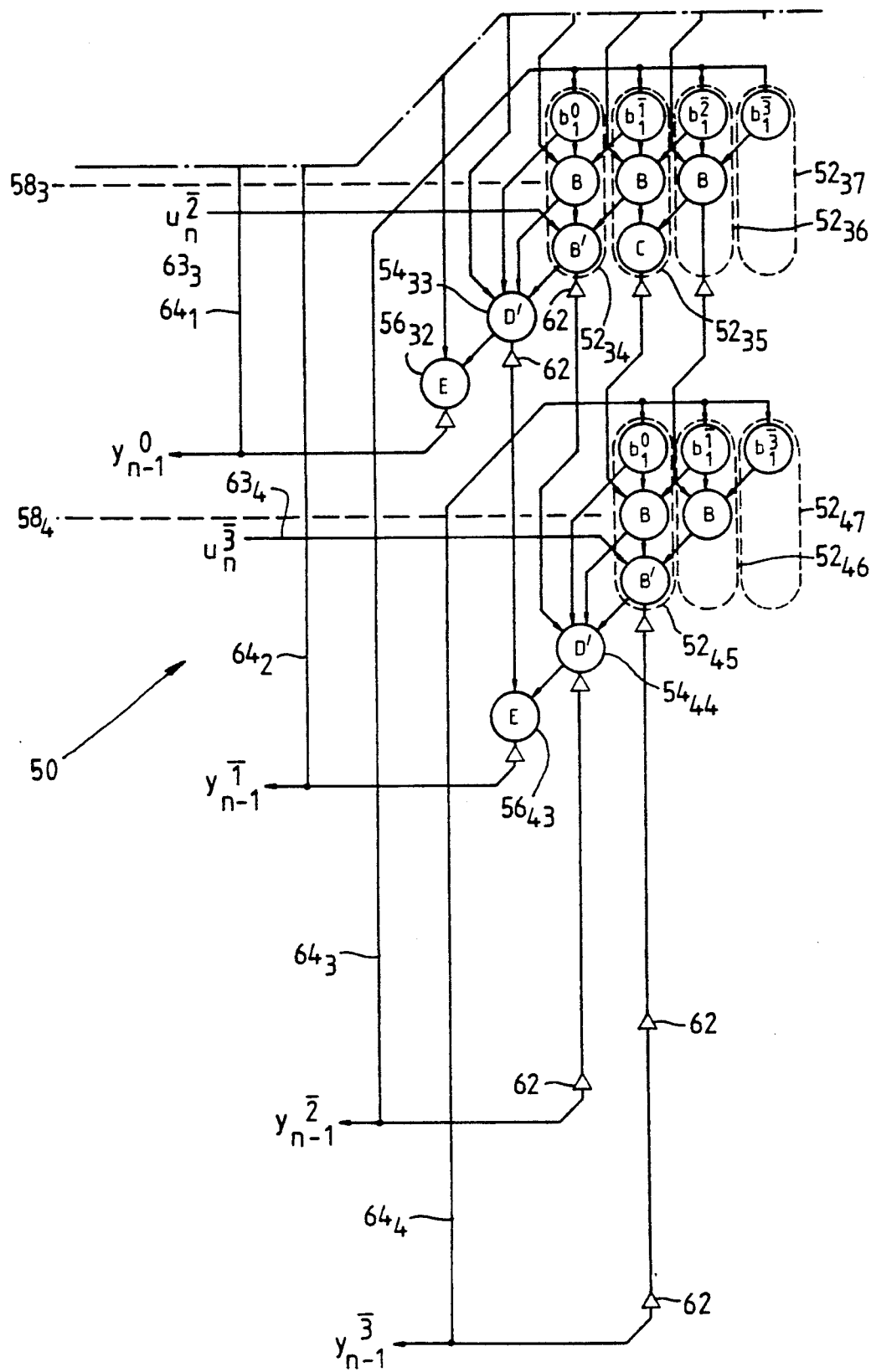
Figure 3C:
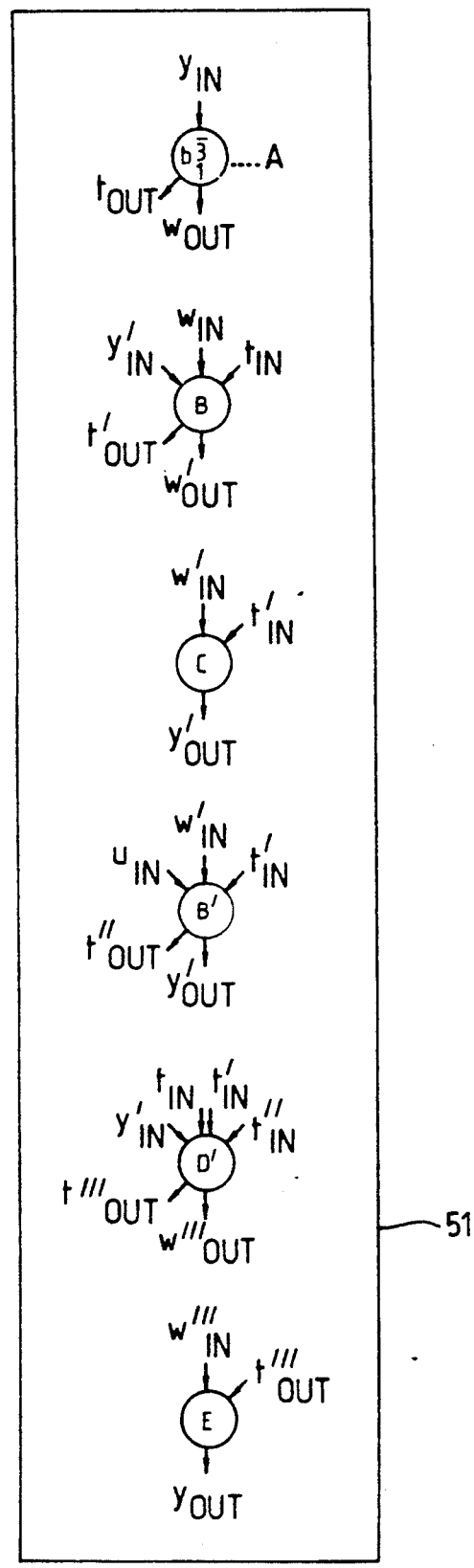
FIG. 3C shows cell inputs and outputs for the processor of FIGS. 3A and 3B.
Figure 4:
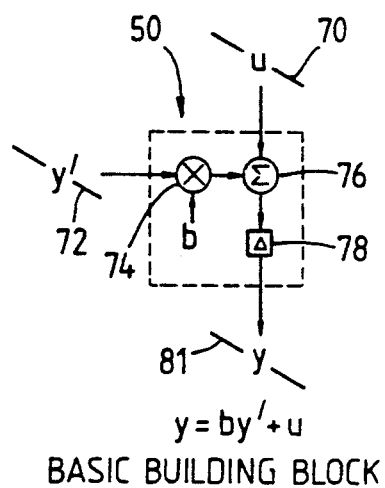
FIGS. 4, 5, 6 and 7 are simplified drawings of processors illustrating implementation as building blocks for various IIR filter functions.

Referring now to FIGS. 3A, 3B and 3C, there is shown a further processor 50. It is a modified version of that shown in FIG. 1 to implement skewed input of $u_n$ terms and multiplication by coefficients in the larger range of about $-2.6$ to $+2.6$ in radix 10. Cell inputs and outputs are illustrated in a box 51. The processor 50 is of very similar construction to the processor 10, and consequently its description will be largely restricted to aspects of difference. It multiplies by coefficient digits $b_1^0$ to $b_1^3$ contained in the respective multiplier cells of each row. Each digit can take any values in the range ($-2$ to 30 2), and so the value of $b_1$ is in the range $-2.222$ to $+2.222$ in radix 4.

The processor 50 contains multiplier cells 52 and type D' and E accumulator cells 54 and 56 arranged in rows $58_1$ to $58_4$ and columns $60_1$ to $60_7$. Latches indicated by triangles such as 62 provide pipelining as before between column neighbours but not row neighbours. Ignoring subcells which are absent since not required for higher output digit significance, most of the multiplier cells 52 have the same structure as cells 16. They incorporate subcells A, B, B' and C as shown at 51 providing multiply, full add and half add functions. However, the most significant multiplier cells $52_{j,j+1}$ (j=1 to 4) in each row $54_j$ incorporates an A subcell together with successive B and B' subcells. The C subcell of other multiplier cells is therefore replaced by a type B' subcell, and this provides for an additional addition function via input lines $63_1$ to $63_4$. The B' subcells have an identical function to that of B subcells, but input and output signals differ as shown in the box 51. The lines $63_1$ to $63_4$ supply respective input digits $u_n^o$ to $u_n^3$ to most significant multiplier cells $52_{12}$ etc. However, synchronous input digits $v_n^1$ to $v_n^4$ may also be supplied to top row B sub-cells as illustrated, in a similar manner to inputs $u_n^1$ etc in the FIG. 1 processor 10.

The effect of exchanging a C subcell for a B' subcell is to introduce an extra transfer digit $t_{out}'$ from the most significant multiplier cells $52_{12}$ etc. These cells now produce three transfer digits, as opposed to two for other multiplier cells such as $52_{13}$. The type D' accumulator cells in at least the second row onwards must therefore accept four inputs, one sum digit of type y' (range $-3$ to $+3$) and three transfer digits (range $-1$ to $+1$). The range of the sum of these digits is ($-6$ to $+6$), which can be accommodated by output sum and transfer digits of types w and t. As previously described with reference to Equation (11), D cells in the processor 10 had inputs with a sum in the range ($-5$ to $+5$), whereas the output expression w+rt has a range ($-6$ to $+6$). The full output range of the D cell was therefore not exercised, and it can accommodate an extra transfer digit input as provided in the processor 50. The prime superscript to D' cells accordingly indicates a similar function to that of D cells, but including an additional transfer digit input.

In consequence of the increase in maximum size of the coefficient $|b_1|$ to 2.66, recycled output digits $y^p$ generate products of higher digit significance as compared to the equivalent for the processor 10. To compensate for this, output digits are fed back to the next but one preceding row (as opposed to the preceding row in the processor 10). Each output digit $y_{n-1}^p$ (p=0 to 3) is recycled via a line $64_{p+1}$ to the respective row $59_{p+1}$. The most significant output digital $y_{n-1}^0$ will be multiplied inter alia by most significant coefficient digit $b_1^0$. This produces a product with two digits, $t_{out}$ of significance $+1$ and $w_{out}$ of significance 0. The latter is of the same significance as $y_{n-1}^0$. It must therefore be produced in the same processor column, since as previously indicated each column is associated with sum and transfer digits of constant significance. The selection of the row to which each output digit is recycled is in accordance with the significance of the recycled digit in combination with that of the most significant coefficient digit, the latter indicating coefficient magnitude. To illustrate this, consider the recycling of $y_{n-1}^1$. When multiplied by $b_1^0$, this digit will provide sum and transfer digits of significance 1 and 0 respectively. The transfer digit will be added to other digits to produce an output digit of significance 1; i.e. the multiply and add operations introduces a digit significance increase of 2, as compared to that of the sum digit arising from multiplication and equal to the digit significances of $y_{n-1}^1$ and $b_1^0$ added together. Each recycled digit therefore generates a contribution to another digit two levels higher in significance in consequence firstly of multiplication of $b_1^0$ and secondly of accumulation with other digits in accordance with radix 4 arithmetic. Each recycled digit must accordingly be fed back to the next but one preceding row. In comparison, the processor 10 operates with like arithmetic, but its maximum coefficient digit $b_1^1$ is one level power in digit significance. Each of its recycle digits can only produce a contribution to a respective output digit one level higher in significance. It therefore requires feedback of each recycle digit only to the respective preceding row. If the most significant coefficient were to be of significance $\bar{2}$, $\bar{3}$ or smaller, feedback or recycling would be in the same row or a subsequent row to compensate for decreasing coefficient magnitude. Moreover, other processors of the invention using radices other than 4 may produce a recycle digit significance increase of more than 2 in consequence of accumulation. The selection of the row to receive feedback is adjusted to compensate for this.

Generally speaking, recycle row selection is in accordance with accumulation arithmetic, coefficient magnitude and recycle digit significance.

Because the processor 50 recycles between non-adjacent rows, contributions to output results must pass through three latches 62. A new result is therefore generated every three cycles after input, and the generation and input rates are once every three cycles. This is slower than the processor 10, and is a consequence of increasing coefficient size.

The processor 50 also differs from the processor 10 in that it has two overflow outputs O/F. These are the transfer digit output of the first row D' cell $54_{11}$ and the sum output of the second row E cell $56_{21}$. The need for this arises as follows. The coefficient $b_1$ may take values in the range +2.66 to −2.66 (approximately) in radix 10, and each $u_n$ has a maximum value approaching 4.

Equation (3) provides:

$$y_n = u_n + b_1 y_{n-1}$$

Operation of Equation (3) allows $y_n$ to increase without limit as n increases if $b_1$ and $u_n$ are large enough. This is a basic characteristic of any recursive processor such as an IIR filter. The net effect of increasing allowed maximum values of $b_1$ from $|0.66|$ (processor 10) to $|2.66|$ (processor 50) is to produce the possibility of overflow. To avoid overflow, either the input non-recursive terms $u_n$ (and/or $v_n$) or the coefficient $b_1$ must be restricted in value. A non-zero value at either of the outputs at O/F indicates that this restriction has not been observed, and provides an alarm.

The output digits $y_{n-1}{}^{\bar{2}}$ and $y_{n-1}{}^{\bar{3}}$ are output from cells $54_{44}$ and $52_{45}$ via two and three latches 62 respectively. These latches preserve the temporal output skew, i.e. the one cycle delay between output digits of adjacent significance. They also correspond to vestigial extra rows lacking multiply/add functions as previously described.

The processor 50 contains a respective B subcell in each first row multiplier cell for the purposes of adding a non-skewed input $v_n$. If this is not required, the B subcells may be omitted. First row cells would then contain only A and C subcells, apart from the most significant first row cell which would retain a B' subcell instead of a C subcell to add $u_n{}^0$.

Referring now to FIGS. 4 to 7, in which like parts are like-referenced, there are shown schematic functional drawings illustrating use of the processor 50 as a building block for use in IIR filter applications. For illustrational clarity, individual digits of terms being processes are not shown, and inputs of the kind $v_n$ are not employed.

The processor 50 is illustrated in open loop form as a building block allowing any required connection scheme, i.e. there is (as yet) not recycle connection. It receives an input term u with temporally skewed digits indicated by a diagonal line 70. It receives a second skewed input y' (diagonal line 72), and y' is multiplied by a coefficient b at 74. The product by' is added to u at 76, and the sum passes via a system delay represented by clock-activated storing means 78 to provide an output y at 80. The output signal y has a temporal skew indicated by a line 81 and equivalent to those of inputs u and y'.

Figure 5:
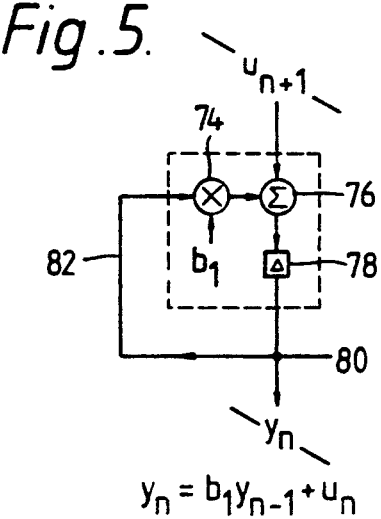

In FIG. 5, the processor 50 is shown arranged as a first order section IIR filter. This merely requires a connection 82 from the output 80 to provide a multiplicand input at 74. By virtue of the delay introduced at 78, $u_{n+1}$ provides an input 70 simultaneously with output of $y_n$ at 80, $y_n$ being given by:

$$y_n = u_n + b_1 y_{n-1}$$

which is Equation (3) as before. On the subsequent processing cycle (three clock cycles later), i.e. one processing cycle after that illustrated in FIG. 5, $u_{n+2}$ will provide the input 70, and the output at 80 will be $y_{n+1}$ given by $$y_{n+1} = u_{n+1} + b_1 y_n \qquad (12)$$

Accordingly, by induction, a stream of input terms $u_n$ (n=0,1,2 ...) gives rise to a stream of output terms $y_n$ representing the input filtered by a first order IIR filter section.

Figure 6:
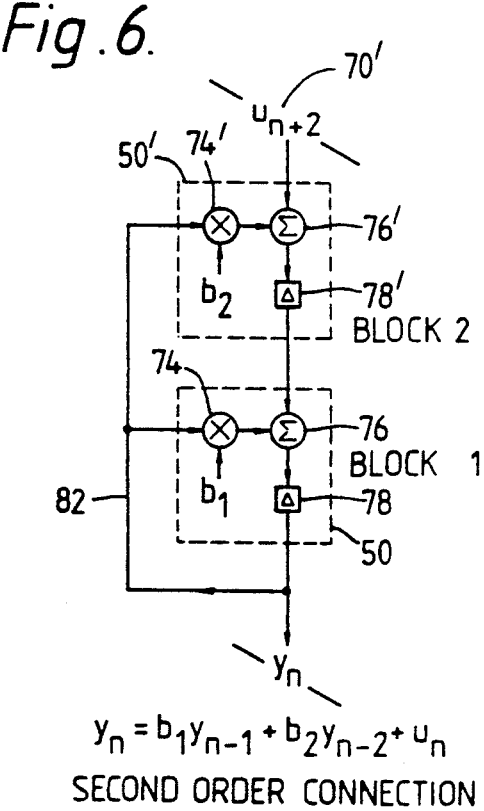

FIG. 6 schematically illustrates two processors 50 and 50' connected in cascade to form a second order filter section. They are each equivalent to that shown in FIG. 4, and like parts are like-referenced. However, parts of the upper processor 50' have prime indices to distinguish them from the accompanying processor 50, and they are associated with respective multiplier coefficients $b_2$ and $b_1$.

The output 80 of the processor 50 is connected to a recycle line 82 providing multiplicand inputs at 74 and 74' to both processors 50 and 50' simultaneously. The output 80 is illustrated at a time when it has received $y_n$ from storing means 78. At this time, the upper processor 50' is receiving an input 70' of $u_{n+2}$, which consequently becomes added by adder 76' to $b_2 y_n$ from multiplier 74'. The output of adder 76' input to storing means 78' is therefore $u_{n+2} + b_2 y_n$. Simultaneously, the output of storing mean 78' is the earlier equivalent of this involving the input term $u_{n+1}$, i.e. $u_{n+1} + b_2 y_{n-1}$. The output of storing means 78' is the input to adder 76, where it is added to $b_1 y_n$ generated by multiplier 74 from $y_n$ recycled via line 82. This produces $y_{n+1} = u_{n+1} + b_1 y_n + b_2 y_{n-1}$ at the input to storing means 78 simultaneously with output therefrom of $y_n$. The expression for $y_n$ is given by replacing n+1 by n in that for $y_{n+1}$, which provides $$y_n = u_n + b_1 y_{n-1} + b_2 y_{n-1} \qquad (13)$$

Figure 7:
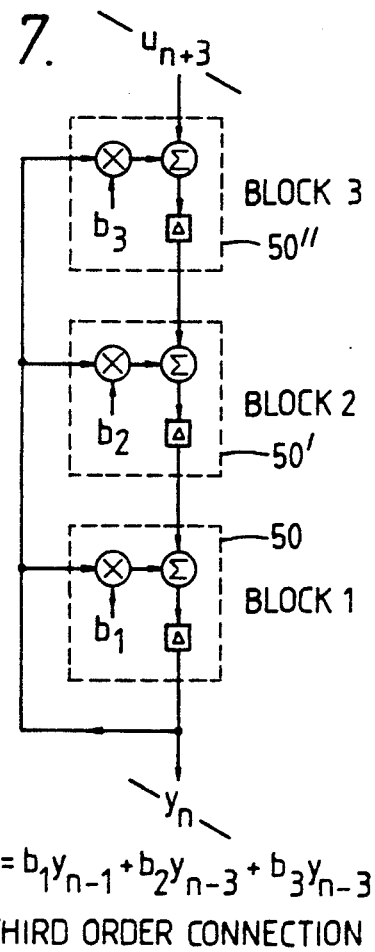

Equation (13) is the general expression for the recursive portion of a second order IIR filter section, which demonstrates that two cascaded processors of the invention can provide such a filter. As illustrated in FIG. 7, three processors 50, 50' and 50" of the invention may be cascaded to provide a third order IIR filter section, and additional processors may be added to construct higher order filters.

Figure 8:
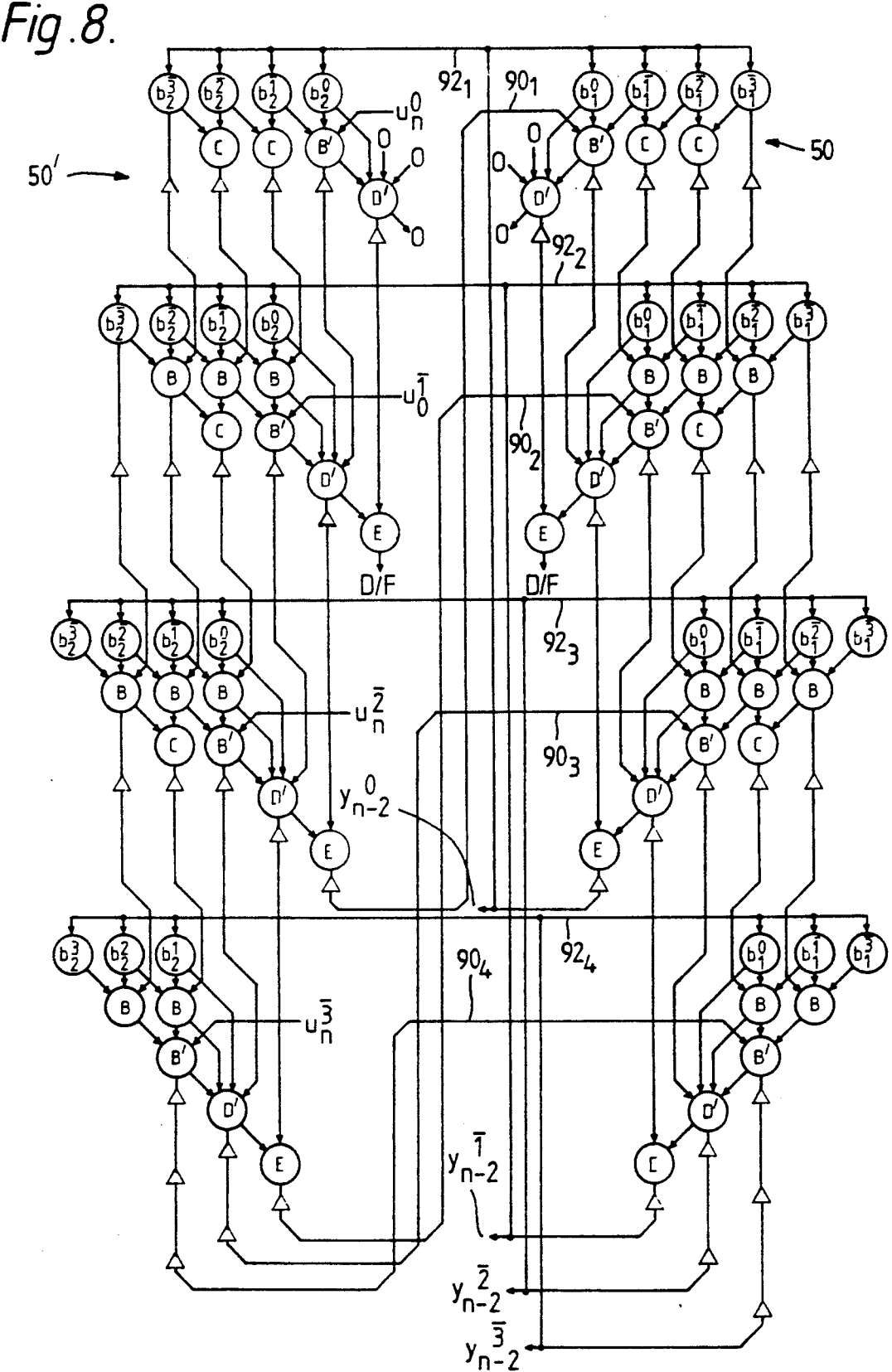
FIG. 8 is a more detailed drawing of the processor FIG. 6.

Referring now to FIG. 8, the second order IIR filter section of FIG. 6 is shown in more detail. Cell reference numerals have been omitted to reduce complexity. It comprises two processors equivalent to 50 and 50' and referenced accordingly, but these are modified as previously described by omission of unnecessary top row B sub-cells, there being no $v_n$ input. In consequence, the top row D' cell of each processor 50/50' cannot produce an overflow output. This can only occur at a second row E cell. Successive digits $u_n{}^m$ are input to the most significant multiplier B' sub-cell of the left hand processor 50'. Intermediate output digits are fed from the processor 50' via lines $90_1$ to $90_4$ to respective most significant multiplier B' sub-cells of the processor 50. Recycle or feedback digits $y_{n-1}{}^0$ to $y_{n-1}{}^3$ are fed from the processor 50 as multiplicand inputs to respective rows of both processors 50 and 50' via lines $92_1$ to $92_4$.

Figure 9:
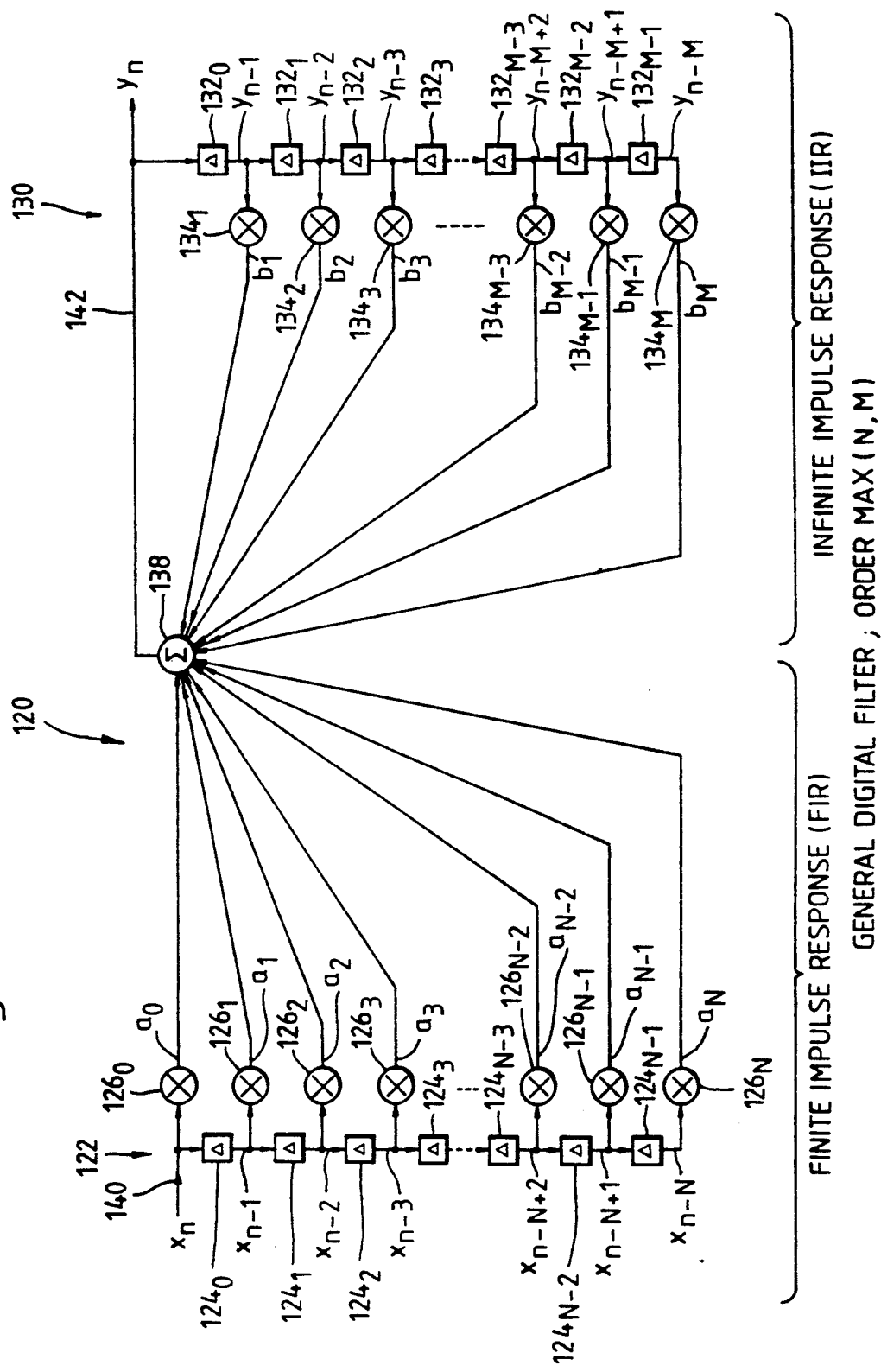
FIG. 9 is a generalised representation of a digital filter.

Referring now to FIG. 9, there is shown a schematic representation of a general digital filter 120. It has a left hand or input portion 122 comprising a chain of latches $124_0$ to $124_{N-1}$ connected in series. An input $x_n$ is connected to multiplier $126_0$ and latch $124_0$. The outputs of the latches are connected to respective multipliers $126_1$ to $126_N$ associated with multiplicative coefficients $a_0$ to $a_N$ respectively. The filter 120 also has an output portion 130 comprising a second series chain of latches $134_0$ to $132_{M-1}$ with outputs connected to respective multipliers $134_1$ to $134_M$. The multipliers $134_1$ to $134_M$ are associated with multiplicative coefficients $b_1$ to $b_M$ respectively.

The outputs of both sets of multipliers $126_0$ to $126_N$ and $134_1$ to $134_M$ are summed by an adder 138. The filter 120 has an input 140 which is shown receiving $x_n$, this being the nth in a series $x_1, x_2, x_3$ ... etc. The latches $124_0$ to $124_{N-1}$ and $132_0$ to $132_{M-1}$ correspond to delays between computation stages, and are assumed to be equal. This is easily ensured in practice by providing additional internal delays for faster computation stages.

As illustrated, when multiplier $126_0$ receives $x_n$, multiplier $126_1$ is receiving $x_{n-1}$ input one processing cycle earlier to multiplier $126_0$ and delayed at latch $124_0$. Similarly, the ith multiplier $126_i$ receives $x_{n-i}$ (i=0 to N). Simultaneously, the adder 138 has a sum output 142 providing $y_n$ and connected to the first output latch $132_0$. By virtue of delay at successive latches $132_0, 132_1$, etc, the ith output multiplier $134_i$ receives $y_{n-i}$ (i=0 to M) when $y_n$ is output by the adder 138. By inspection, it can b seen that $y_n$, the output of adder 138 is given by $$y_n = a_0 x_n + a_1 x_{n-1} + \ldots + \quad (14)$$
$$a_N x_{n-N} + b_1 y_{n-1} + b_2 y_{n-1} + \ldots + b_M y_{n-M}$$

$$\text{ie } y_n = \sum_{i=0}^{N} a_i x_{n-i} + \sum_{i=1}^{M} b_i y_{n-i} \quad (15)$$

The non-recursive summation term (FIR filter relation) involving $x_{n-i}$ in Equation (15) may be computed by prior art multipliers. The recursive term (IIR filter relation) involving $y_{n-i}$ is computed by building block processors 50 of the invention and illustrated in FIGS. 4 to 7. The invention accordingly provides for the general digital filter to be realised.

The embodiments of the invention previously described with reference to FIGS. 1 to 3C and 8 are based on radix 4 signed digit number representations (SNDRs). Use of a small radix (e.g. radix 2) can however lead to circuitry economies and increased operating speed, as in the case of conventional non-redundant binary logic systems. Embodiments of the invention will now be described which are based on redundant binary arithmetic.

Figure 10A:
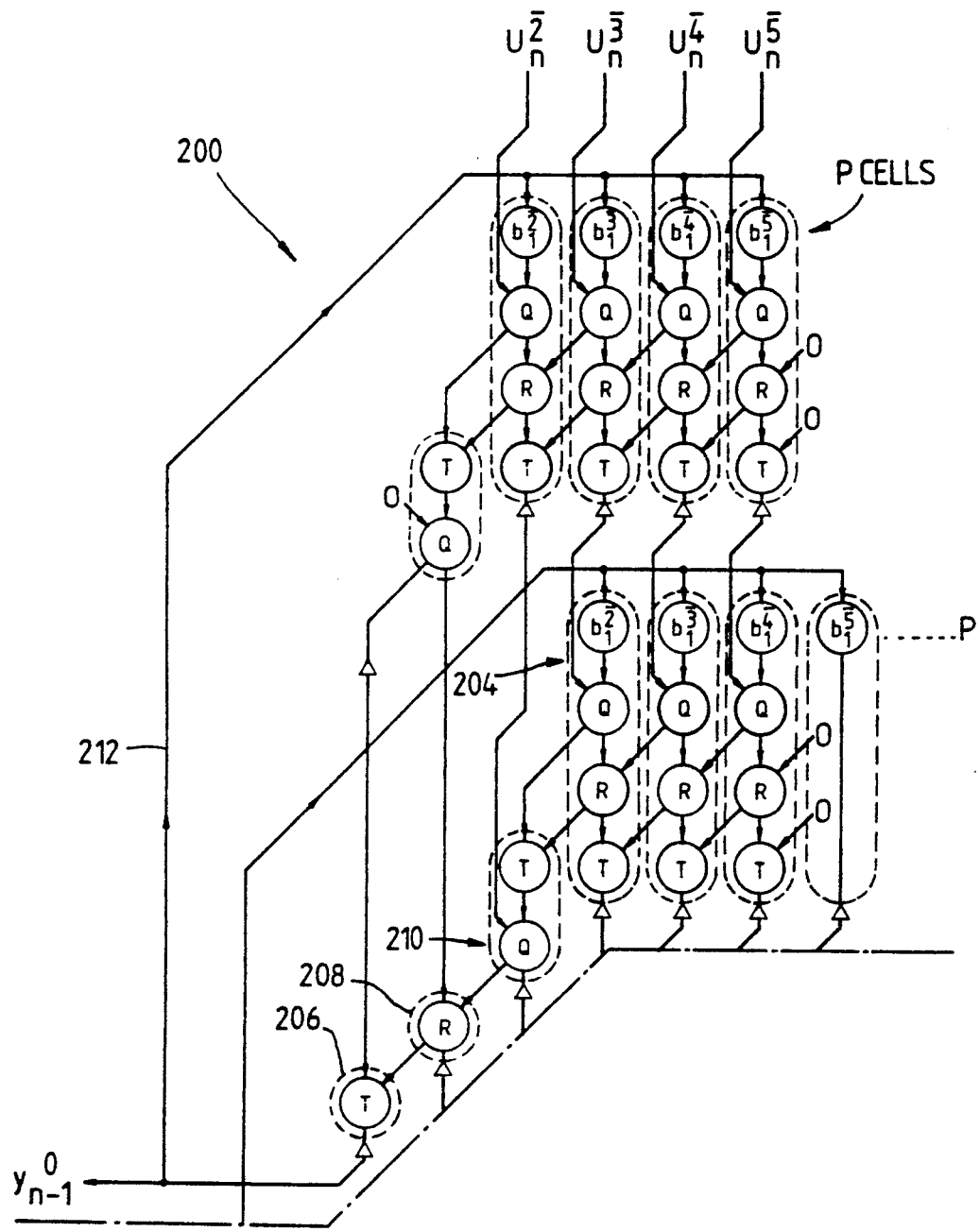
FIGS. 10A and 10B show in two part form a processor of the invention.
Figure 10B:
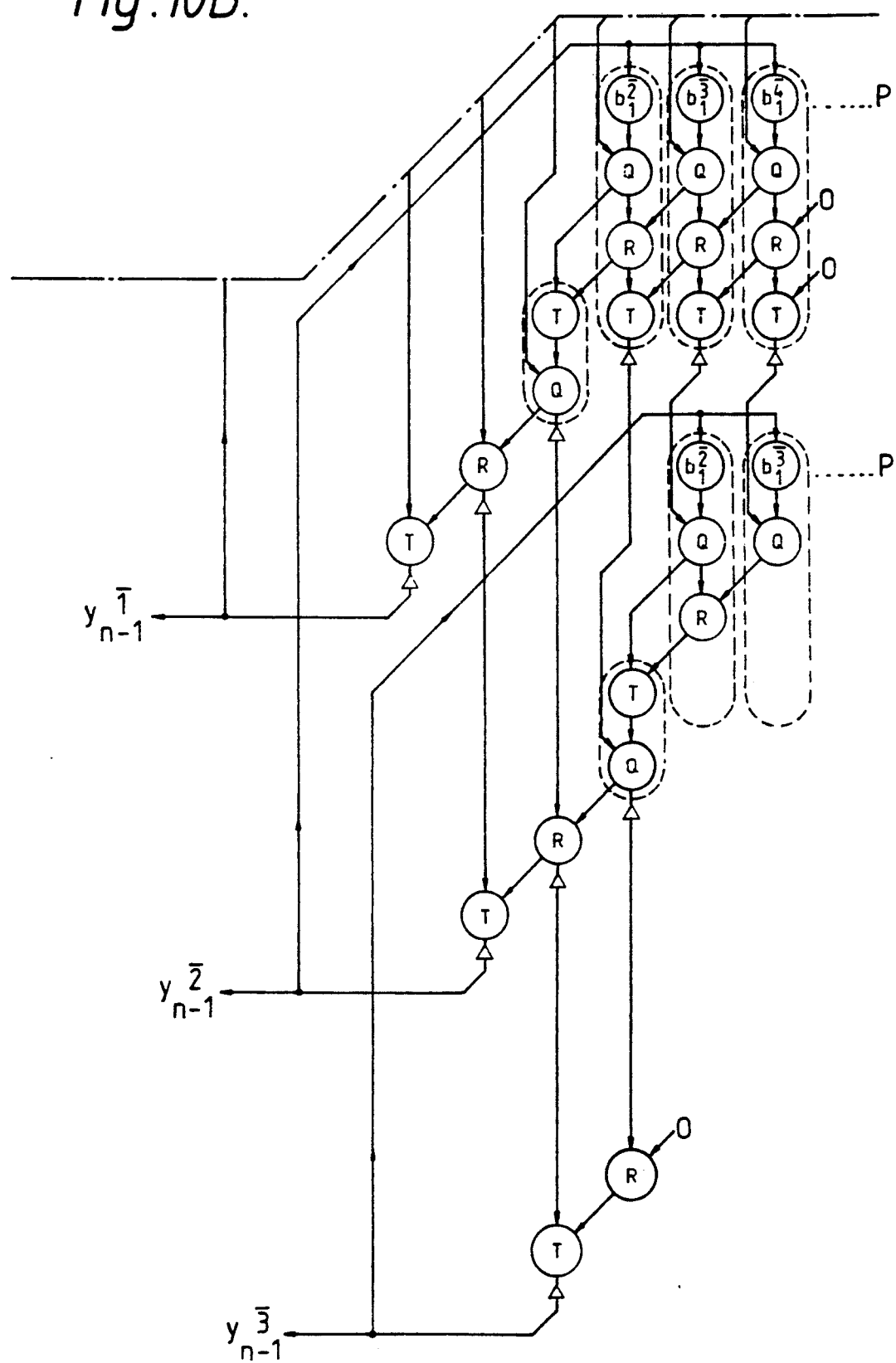
Figure 10C:
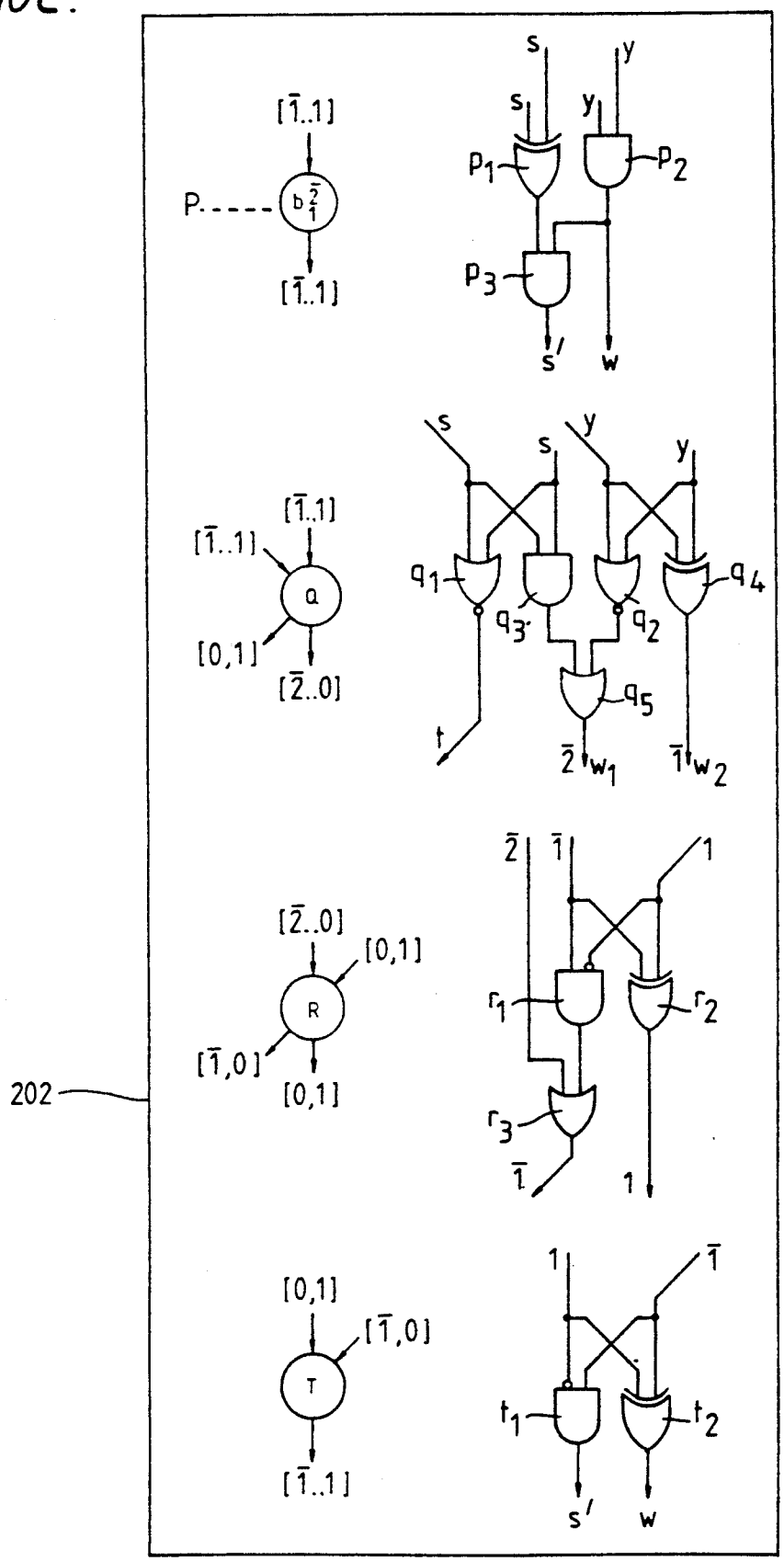
FIG. 10C shows cell and subcell functions and electronic cell implementations for the processor of FIGS. 10A and 10B.

Referring to FIGS. 10A, 10B and 10C, there is shown a processor 200 together with an inset box 202 in which cell and subcell functions and electronic cell implementations are illustrated. The processor 200 is very similar to the processor 10 of FIG. 1, and in consequence the following description will concentrate on areas of difference. The processor 200 comprises an array of processing cells connected to form five rows and seven columns. The number of cells per row diminishes down the array, cells unnecessary for the required accuracy being omitted. All cells are based on radix 2 arithmetic. Latches indicated by $\Delta$ symbols provide pipelining between (but not along) rows, and are activated synchronously as previously described.

Other than the vestigial lowermost row, the rows of the processor 200 comprise multiplier cells with multiply-add functions such as second row, fourth column cell 204 enclosed in dotted lines. The multiplier cells are accompanied by three accumulator cells 206, 208 and 210 in the first, second and third columns respectively. The second row typifies the array row structure. The multiplier cell 204 and two row neighbours to its right incorporate respective type P, Q, R and T subcells. Each P subcell is a single digit multiplier. It receives a single input digit, and multiplies this by a stored digit $b_1{}^m$ (m= $-2$, $-3$, $-4$ or $-5$) to generate an output digit. Each of the input, stored and output digits is in the redundant binary set $(-1,0,1)$.

The product digit output from a P subcell is the vertical input to the associated Q subcell, which adds the product digit to an upper left input digit in the set $(-1,0,1)$. This is arranged to produce a lower left output transfer digit equal to 0 or 1 and a vertical sum output digit in the (super-redundant) set $(-2,-1,0)$. The upper left input is a digit $u_n{}^m$ of the non-recursive input $u_n$ (m= $-2$, $-3$, $-4$ or $-5$) for top row multiplier cells, or the associated column neighbour sum output sum digit is passed as a vertical input to the associated R subcell. The R subcell adds this input to a transfer digit (value 0 or 1) input from above right and generated in a Q subcell in a neighbouring multiplier cell (where available). The result of this addition is a transfer digit ($-1$ or 0) output below left and a sum digit (0 or 1) output vertically below. The transfer digit passes to a neighbouring multiplier cell or accumulator cell (to be described later). The sum digit passes to the associated T subcell, which adds it to a transfer digit ($-1$ or 0) produced in the R subcell of the right hand neighbouring cell where available). The output of the T subcell is a sum digit of the redundant set ($-1$, 0 or 1), which passes vertically down the cell column into the row below. No transfer digit is produced.

The multiplier cells such as 204 illustrate the consequences of changing from radix 4 (in FIG. 1) to radix 2. Unlike the processor 10, a transfer digit is not generated in the type P multiplier subcells, since only multiplication by $-1$, 0 or $+1$ is involved. However, three adder subcells types Q, R and T are required to perform the addition part of the multiply-add function, as opposed to two (A and B) in the processor 10. Moreover, the Q and R subcells collectively generate two transfer digits, whereas the addition operation in a FIG. 1 cell 16 produces one transfer digit. The row structures and arithmetic functions of the processors 10 and 200 are similar in that any transfer digit generated in one stage of the computation in one cell is employed in a later stage of the computation executed in a neighbouring cell. This means that transfer digits generated in one cell affect only computations in cells to the left in the same row up to two places removed. It removes the requirement for transfer digits to be allowed to ripple along the entire length of a row, which occurs in conventional ripple-carry circuits. In consequence, row settling times are finite and independent of the number of cells in a row.

Turning now to the accumulator cell structure of the processor 200, this is exemplified by the second row accumulator cells 206, 208 and 210 in the first, second and third columns respectively. The cells 206 and 208 are respectively T and R cells, whereas cell 210 comprises T and Q subcells in cascade. Of these, the accumulator cells 210 adds the sum digit generated by the column neighbour above it to the transfer digits produced by the row neighbour 204 to its right. The neighbours are those multiplier cells associated with the multiplier digit of highest significance $b_1^{\bar{2}}$ (i.e. $b \times \frac{1}{4}$, where $b = -1, 0$ or 1). The three inputs to the accumulator cell 210 are digits having respective ranges (0,1), (−1,0) and (−2,−1,0), the last being the sum input digit. The accumulator T subcell adds the first two of these digits to produce a single digit sum output in the range (−1,0,1). The Q subcell then adds this output digit to the sum output digit (−1,0,1) of the T subcell in the column neighbour cell above. The accumulator Q subcell consequently provides output of a sum digit (−2,−1,0), which passes down the column, and a transfer digit (−1,0) which passes left along the row to the R accumulator cell 208. The R cell adds this transfer digit to the sum output digit of the T-Q accumulator cell in the row above. This generates a sum digit (0,1) for passage down the column, and a transfer digit (−1,0) for passage left along the row to the T accumulator cell 206. The T cell adds the transfer digit to the T-Q accumulator cell output transfer digit (0,1) of the row above. The T cell output is a single digit, a sum digit in the set (−1,0,1). This digit is the row output digit, $y_{n-1}^0$, and it is fed back as a multiplicand input to each cell of the preceding row via a feedback line 212.

Each row accumulating device exemplified by cells 206-208-210 adds digits from its own row and the respective row above to produce a row output digital such as $y_{n-1}^0$ having a digit significance of 0 as indicated, which is two levels higher than that of the inputs to the T-Q accumulator cells such as 210. Multiplication of $y_{n-1}^0$ by the most significant multiplier digit $b_1^{\bar{2}}$ generates a product digit $b_1^{\bar{2}} y_{n-1}^0$ of significance $\bar{2}$ (or −2). Consequently, the output digit significance increase arising from accumulation is cancelled out by the significance reduction arising from multiplication, and output feedback to the immediately preceding row is appropriate. This provides a processor latency of two clock cycles. If however the processor 200 were to be reconfigured to accommodate a maximum multiplier or coefficient digit significance of $\bar{1}$, i.e. an increase in the permitted coefficient range, the feedback lines such as 212 would require connection to the next but one preceding row. Generally, every increase in multiplier coefficient range increases the separation between rows connected by feedback lines with a consequent increase in circuit latency.

Turning now to the detailed implementations of the P, Q, R and T cells shown in the box 202, these incorporate conventional binary logic devices illustrated with connections bearing indicia giving the interpretation to be placed on the relevant bit. The P multiplier subcell consists of an EXOR gate $p_1$ together with two AND gates $p_2$ and $p_3$. The subcell is shown in a form suitable for receiving a multiplier input digit $b_1^m$ (m = −2 to −5) to provide for coefficient reprogramming. The inputs to the subcell P are both in the redundant digit set (−1,0,1), and are each represented by a sign bit s and a magnitude bit y having a weight of 1; s = 1 and 0 correspond to negative and positive respectively, and y = 1 and 0 correspond to magnitudes 1 and 0 because y is treated as multiplied or weighted by 1. Both sign bits s are input to the EXOR gate $p_1$, and the first AND gate $p_2$ receives both magnitude bits y. The output of $p_2$ provides a product magnitude bit w with a weight of 1. The outputs of both gates $p_1$ and $p_2$ are ANDed at $p_3$ to produce an output sign bit s' equal to 1 or 0 according to whether w is negative or positive respectively. The output of the P multiplier subcell represents (−1;0;1) as (s',w) given by (1,1;0,0;0,1). Zero is treated as positive, the output combination (1,0)—negative zero—being disallowed. It is possible to provide for a negative zero, but this merely increases the circuitry required for no increase in benefit.

The Q subcell contains first and second NOR gates $q_1$ and $q_2$, an AND gate $q_3$, an EXOR gate $q_4$ and an OR gate $q_5$. The gates $q_1$ and $q_3$ each receive input of the sign bits s (1 or 0) of both input digits. The gates $q_2$ and $q_4$ each receive both magnitude input bits of the kind y (1 or 0). The output of the first NOR gate $q_1$ provides the transfer digit t (0 or 1). The outputs of gates $q_2$ and $q_3$ are ORed at $q_5$ to provide a first sum output bit $w_1$ (0 or 1) with a weight of −2)l. The output of the EXOR gate $q_5$ provides a second sum output bit $w_2$ (0 or 1) with a wight of −1. In all cases, the weight indicates the value the relevant bit is treated as having when the bit value is 1. The sum output digit w is equal to $-(2w_1 + w_2)$. The Q subcell may be termed an "enthusiastic transfer" device, since it represents the output sum of its inputs as including a non-zero transfer digit t wherever possible. In particular, it represents a zero total sum (i.e. sum + transfer digits) as a transfer digit of 1, a −2 weight bit of 1 and a −1 weight bit of 0. Since the transfer digit is of higher significance, it has an effective weight of +2, and in the case of the zero total sum it cancels the effect of the −2 weight bit.

The R subcell consists of an AND gate $r_1$ having one input inverted, an EXOR gate $r_2$ and an OR gate $r_3$. The gates $r_1$ and $r_2$ each receive input of both bits of weight −1 and 1, the inverting input of $r_1$ receiving the bit of weight 1. The OR gate $r_3$ receives input of the bit of weight −2 together with the output of AND gate $r_1$. The output of OR gate $r_3$ is a transfer digit bit of weight −1, and the output of EXOR gate is a single bit sum digit of weight 1.

The T subcell consists of an AND gate $t_1$ having one input inverted and an EXOR gate $t_2$. Each of the gates $t_1$ and $t_2$ receives both input bits of weights 1 and −1, the bit of weight −1 being routed to the non-inverting input of $t_1$. The output of AND gate $t_1$ provides an output sign bit s' and the output of EXOR gate $t_2$ provides a magnitude bit w. These output bits collectively indicate a sum output digit of (−1,1;0,0;0,1) respectively, as previously described for the output of the P subcell.

Figure 11A:
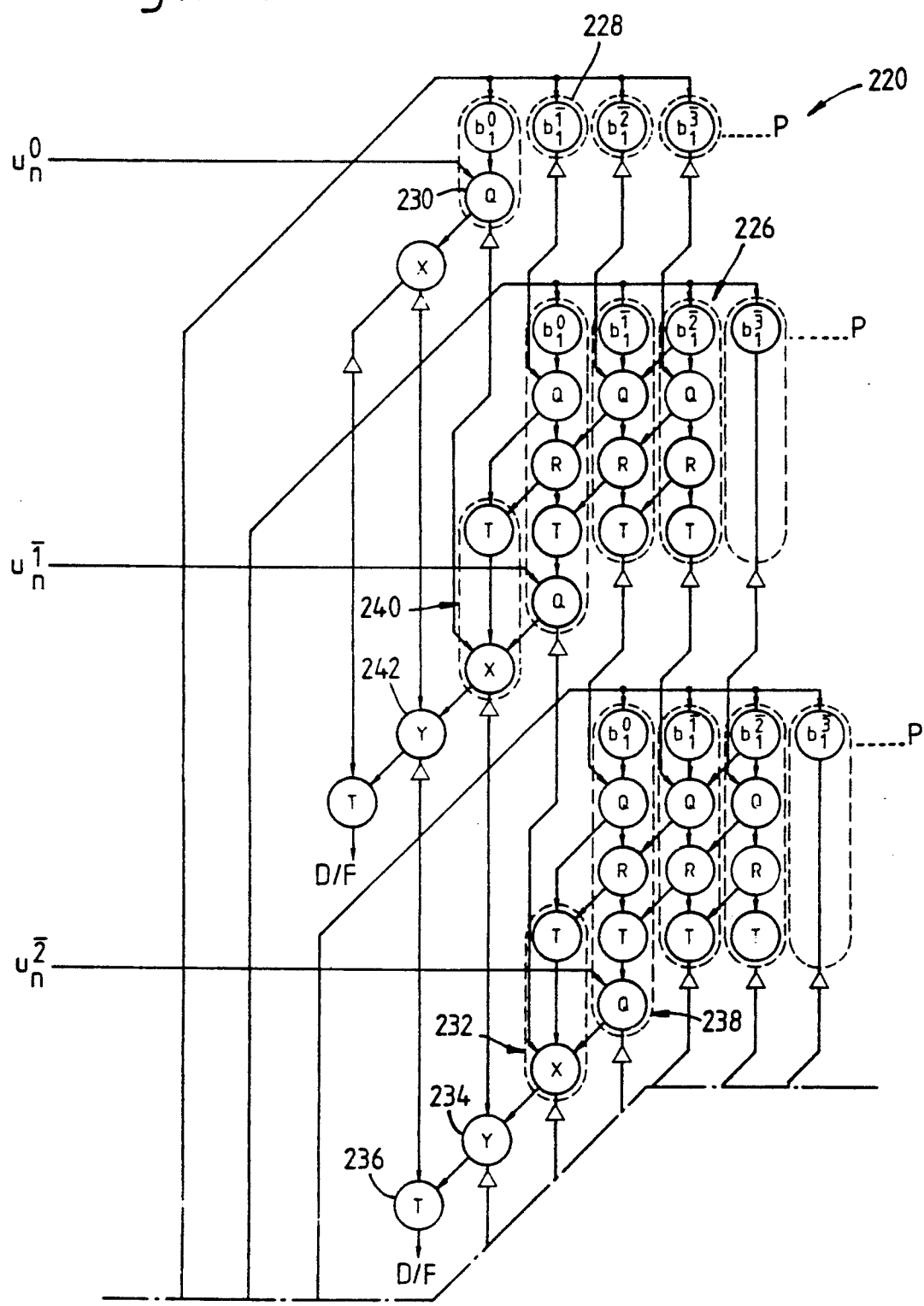
FIGS. 11A and 11B show in two part form an alternative version of the FIGS. 10A, 10B and 10C embodiment arranged for skewed input and increased coefficient magnitude.
Figure 11B:
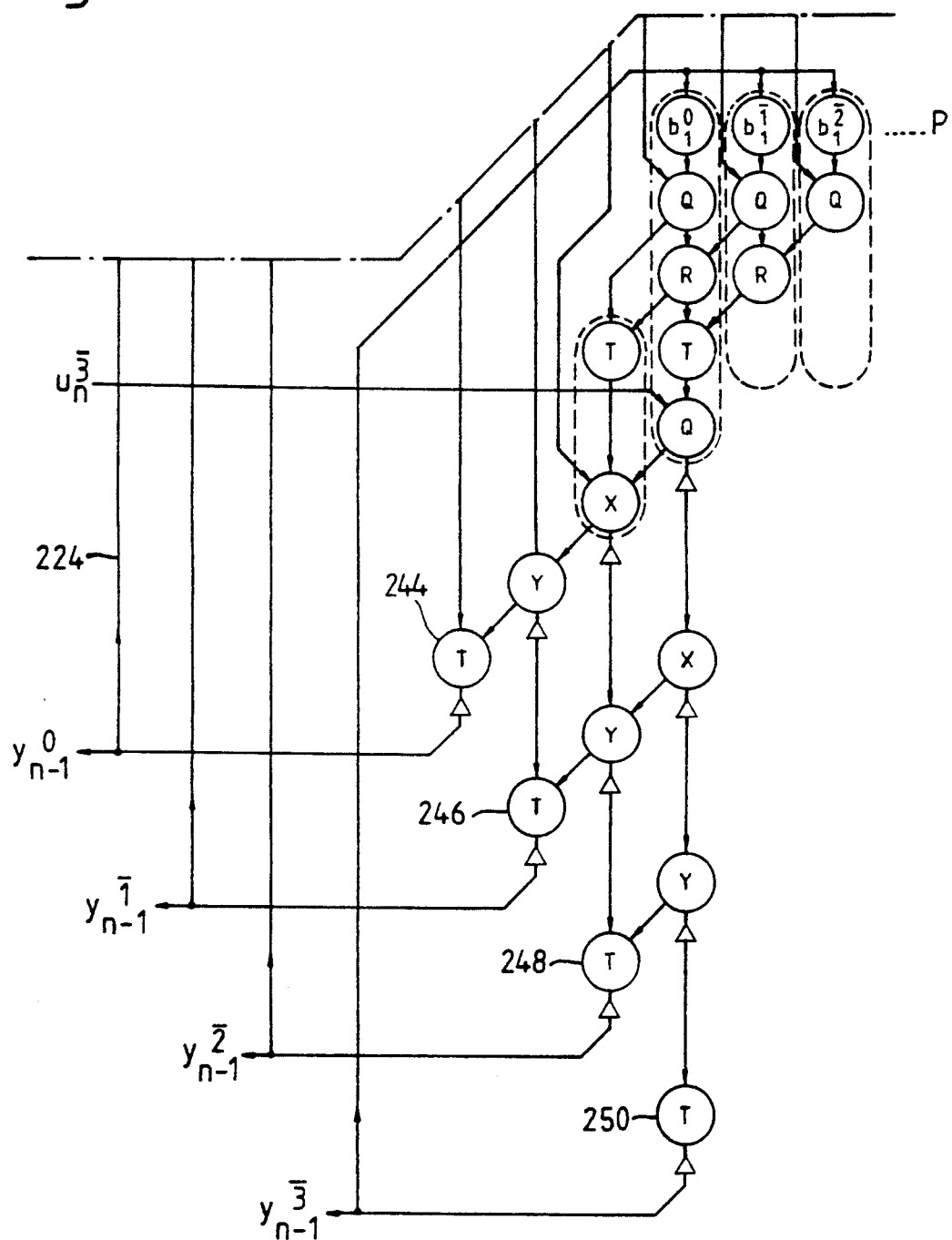
Figure 11C:
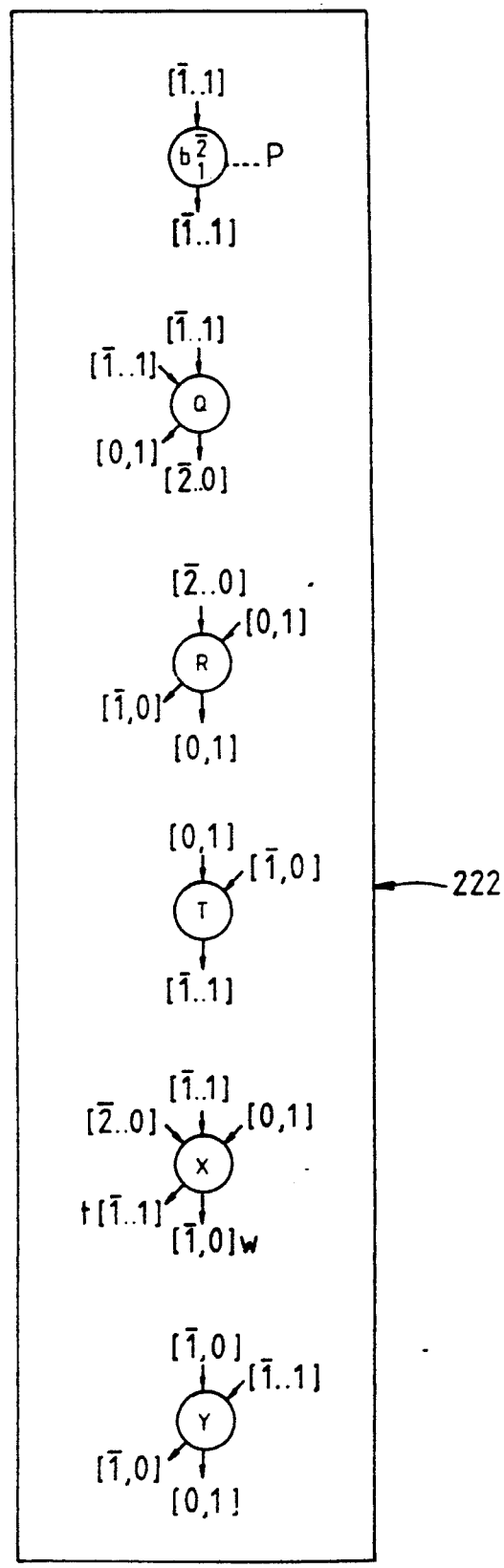
FIG. 11C shows cell and subcell functions for the processor FIGS. 11A and 11B.

Referring now to FIGS. 11A, 11B and 11C, this shows a further processor 220 of the invention arranged for temporally skewed input of the non-recursive term $u_n$. Cell and subcell functions are shown in a box 222. The processor 220 is a modified version of the FIG. 10 processor 200, and the relationship therebetween is similar to that between FIGS. 1 and 3A, 3B and 3C. The first modification relates to increase of the maximum coefficient significance to 0 instead of −2, i.e. the largest coefficient digit is $b_1^0$. This corresponds to a fourfold size increase ($2^2$), since the processor 220 is a radix 2 device. Every doubling in coefficient digit maximum size in radix 2 processing requires an additional row spacing between output and feedback input. In consequence, feedback is from the (n+3)th row to the nth row via lines such as 224 connecting the fourth row output to the first row multiplicand input, where n is 1 to 4.

The processor 220 has rows of multiplier cells such as 226 which are equivalent to those previously described i FIG. 10, except for the further function of adding $u_n$ from the left with temporally skewed digits. This function only requires an additional Q subcell to be incorporated in each row's most significant multiplier cell (where applicable) associated with multiplier digit $b_1^0$. The first row contains multiplier cells such as 228 with no addition function other than a Q subcell 230 arranged to add $u_n^0$ to the product arising from multiplication by $b_1^0$. This is because multiplication of any feedback or output digit ($y_{n-1}^0$ to $y_{n-1}^3$) by a multiplier digit ($b_1^0$ to $b_1^3$) in the range ($-1,0,1$) cannot produce a non-zero transfer digit. Consequently, adder subcells to accommodate addition of transfer digits from neighbouring cell are not required in the first row.

The general accumulation structure of the processor 220 is exemplified by the second, third and fourth rows. Other rows have related but more simplified structures because fewer inputs are available. The general accumulation structure in the third row comprises a third column cell 232 comprising T and X subcells in cascade, together with second and first column cells 234 and 236 of types Y and T respectively. The T cell and subcell are as previously described, but types X and Y are adapted from corresponding Q and R cells of FIG. 10 to accommodate changes to inputs. The designs of X and Y cells are straightforward adaptations of those given earlier, and will not be described in detail.

The T subcell of cell 232 adds transfer digits from the adjacent multiplier cell 238 to produce an output sum (but no transfer) digit ($-1$, 0 or 1) passing vertically down to its associated X subcell. The X subcell adds this sum digit to the sum digit ($-2$, $-1$ or 0) output from the most significant multiplier Q subcell in the row above and to the transfer digit (0 or 1) from the like subcell of cell 238 in the same row. The result is an output sum in the range $-3$ to 2, which is accommodated by a transfer digit (t) in the set ($-1,0,1$) and a sum digit (w) in the set ($-1,0$); e.g. $-3$ and 2 are represented by (t,w) equal to ($-1$, $-1$) and (1,0) respectively.

The Y accumulator cell 234 adds the output transfer digit from the X subcell of cell 232 to the output sum digit from the X accumulator subcell 240 of the row above (the second row). The output of the Y accumulator cell 234 consists of a sum digit (0 or 1) passed vertically down to the column neighbour T accumulator cell in the row below, together with a transfer digit ($-1$ or 0) passed to the left hand row neighbour T accumulator cell 236. This last cell 236 of the third row adds the sum output digit of a second row Y accumulator cell 242 to the transfer digit output of its row neighbour cell 234. The T cell 236 produces an output sum digit (but no transfer) in the redundant set ($-1,0,1$), and this sum digit is the third row output digit. As previously described in relation to FIG. 3, the third row output digit is normally zero; if this digit is non-zero, overflow as indicated by O/F has occurred. Similarly, the second row output (also referenced O/F) is normally zero in the absence of overflow. As has been said, overflow is always possible in recursive processors, and results are ignored if it occurs.

The T accumulator cells (row outputs) to 244 to 250 to the fourth to seventh rows provide sum output digits $y_{n-1}^0$ to $y_{n-1}^3$ for feedback to the first to fourth rows respectively. The processor 220 exhibits numbers of cells per row diminishing down the array by virtue of omission of cells which are not needed to compute $y_{n-1}^0$ to $y_{n-1}^3$. This is exemplified in the fifth to seventh rows, which not only lack multiplier cells but also the number of accumulator cells diminishes to a solitary T cell in the seventh row.

The purpose of each part-row of multiplier cells in FIGS. 10A and 11A (such as 204 and 226) is to multiply the entire coefficient word $b_1^2 b_1^3 b_1^4 b_1^5$ or $b_1^0 b_1^1 b_1^2 b_1^3$ by a single respective feedback digit of the kind $Y_{n-1}^m$ (m=0 to $-3$). This feedback digit is produced redundantly since accumulation is required to be achieved most significant digit first. The feedback digit employs the redundant binary digit set (SBNR) ($-1,0,1$). The processors 200 and 220 also employ multiplicative subcells type P in which the coefficient digits $b_i^m$ are of the same digit set. This allows the multiplicative subcells to be identical and mutually independent, and to generate output products in the same digit set ($-1,0,1$) without transfers. A three stage (Q-R-T) redundant adder subcell structure is then employed to add the product digit to inputs from above and to the right. However, if the multiplication of the feedback digit by the coefficient word could be arranged to yield a result in non-redundant binary form, e.g. 2's complement, then the adder subcell substructure may be of reduced complexity as will now be described.

Figure 12A:
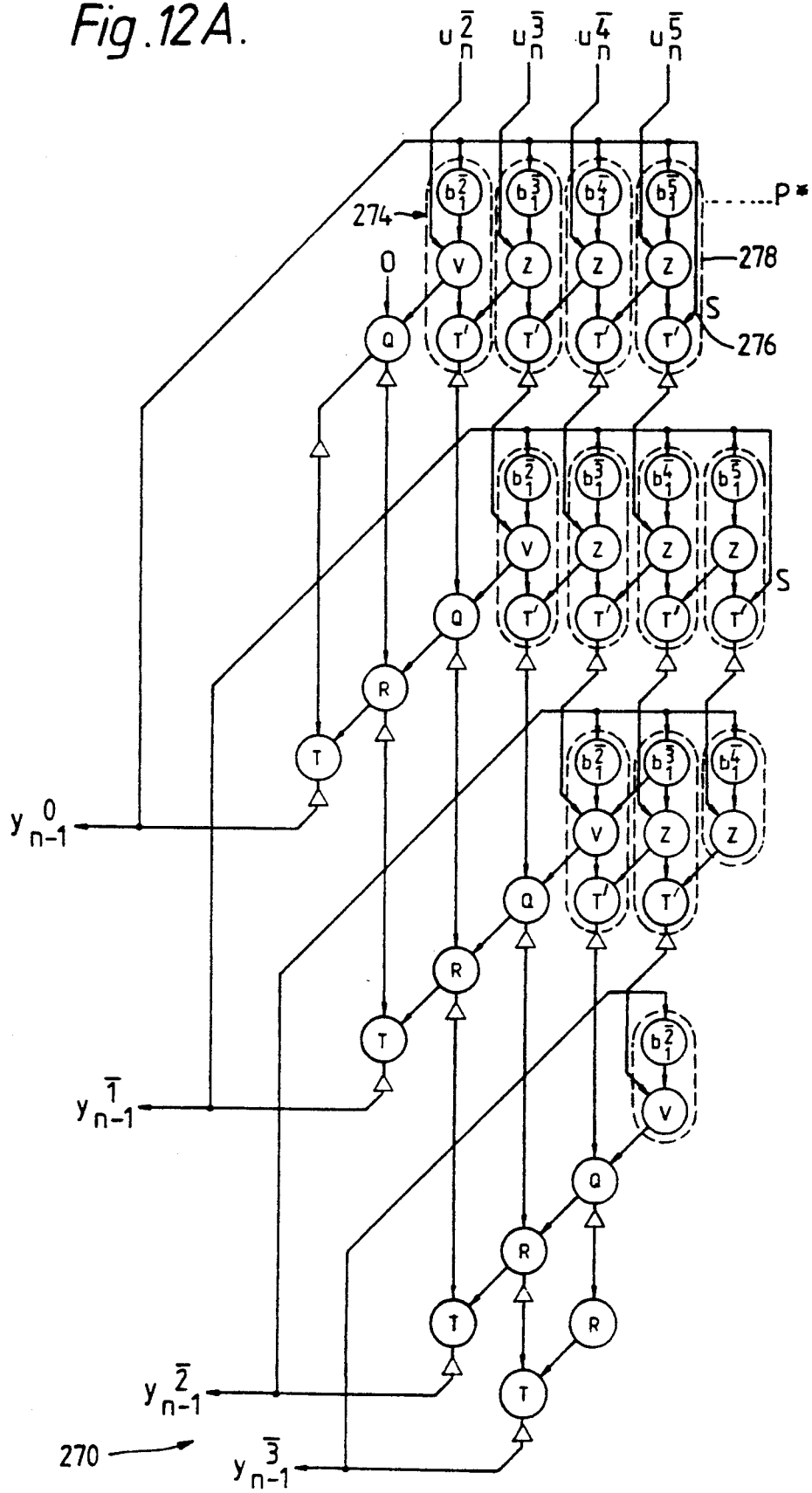
FIG. 12A illustrates a processor of the invention arranged for reduced use of redundant arithmetic.
Figure 12B:
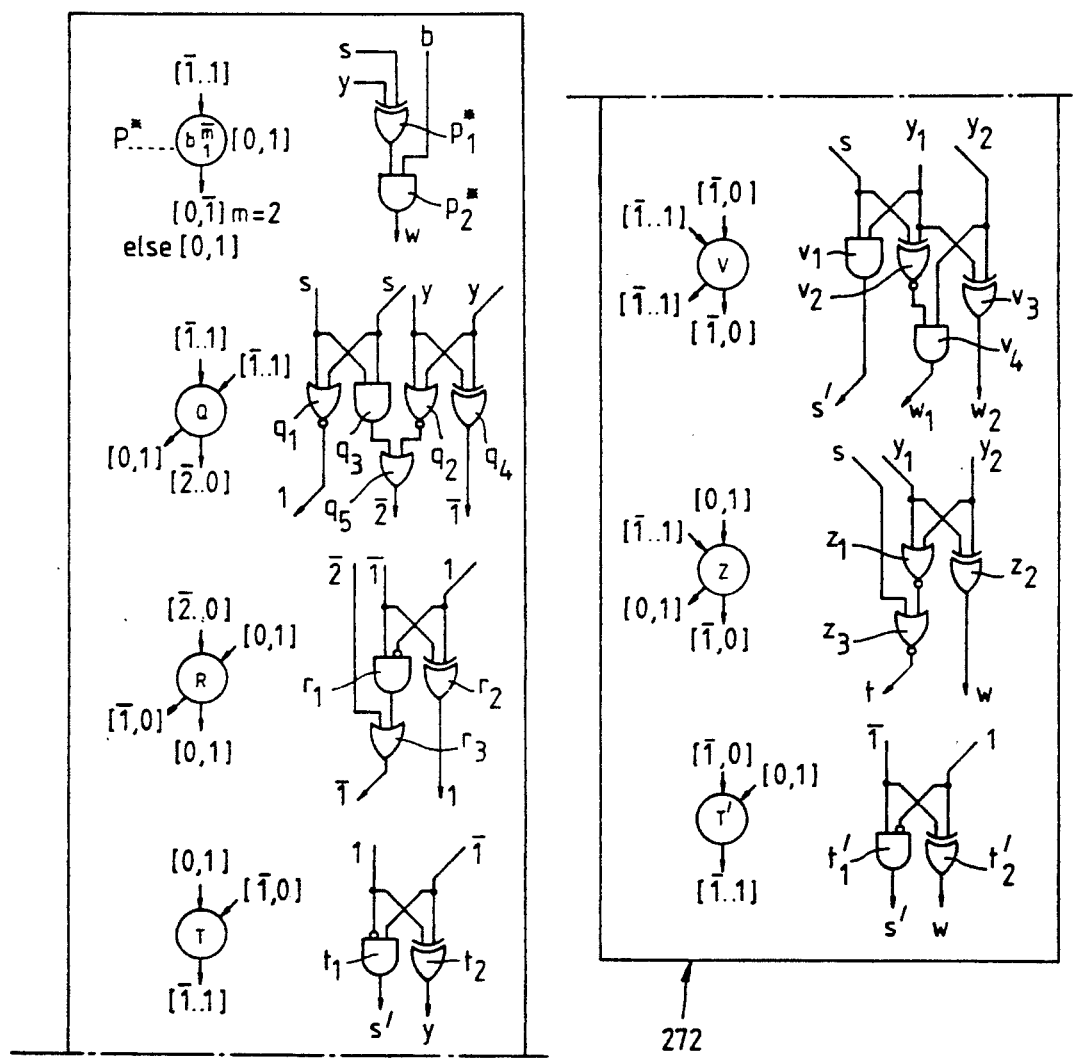
FIG. 12B shows cell functions and gate structures for the processor of FIG. 12A.

Referring to FIGS. 12A and 12B, there is shown a further radix 2 processor 270 of the invention with cell functions in a box 272. The processor is arranged to operate using input, feedback and multiplier digits of the same significance as those employed in the processor 200 of FIG. 10A. The processor 270 is a modified version of the processor 200, the modifications being introduced to restrict the degree of which redundant arithmetic is employed and thereby to reduce circuitry. In its general characteristics, the processor 270 is very similar to that previously described, and the following description will be directed to the modifications.

The processor 270 comprises four rows of multiplier cells such as 274 in the first row, each consisting (where complete) of a multiplier subcell type P* and a chain of two adder subcells. The asterisk of P* indicates a modified version of a cell described earlier. The adder chain consists of either a V or a Z subcell followed by a T' subcell. The V subcell is restricted to the most significant multiplier cell of each row, i.e. the leftmost cell such as 274 associated with multiplier digit $b_1^2$. The processor 270 includes clocked latches $\Delta$ and accumulating means in the form of Q, R and T cells substantially as in the processor 200, except that Q cell is now not a subcell of a composite T/Q cell.

The processor 270 has a vestigial fifth row comprising R and T accumulator cells.

The non-recursive input $u_n$ has digits $u_n^2$ to $u_n^5$ which are fed to respective first row multiplier cells such as 274. This input is treated as retaining the redundant binary digit set structure, i.e. each digit is in the set ($-1,0,1$). This is convenient (but not essential), since it allows the processor 270 to accept $u_n$ inputs in either redundant or two's complement form.

The feedback digits $y_{n-1}^0$ to $y_{n-1}^3$ are generated redundantly, and like $u_n$ are in the set $(-1,0,1)$. The multiplier digits $b_1^2$ to $b_1^5$ are treated as forming a conventional 2's complement number; i.e. $b_1^2$ (most significant bit or digit) has a negative weight and therefore is in the set $(-1,0)$. However, $b_1^3$ to $b_1^5$ have positive weights and are in the set $(0,1)$.

With reference to the first row multiplier cells 274 etc, these are required to multiply a feedback digit $y_{n-1}^0$ in the redundant binary set $(-1,0,1)$ by either a negatively weighted digit ($b_1^2$ multiplier) or a positively weighted digit ($b_1^3$ to $b_1^5$ multipliers). In order to standardise the multiplier subcells, these are all designed to multiply by the non-redundant binary digit set $(0,1)$, but the output of the most significant multiplier subcell ($b_1^2$) is treated as negative when non-zero.

When $y_{n-1}^0$ is 0 or 1, its multiplication by $b_1^2$ to $b_1^5$ is straightforward; i.e. $b_1^m y_{n-1}^0$ ($m = -2$ or $-5$) is 0 if either $b_1^m$ or $y_{n-1}^0$ is 0, and is 1 when both $b_1^m$ and $y_{n-1}^0$ are 1. If $y_{n-1}^0$ is $-1$, the multiplier subcells $p^*$ implement the 2's complement "invert and add one" rule; i.e. all bits are inverted (0 exchanged for 1 and vice versa), and 1 is added to the least significant bit. This is implemented as follows. Since $y_{n-1}^0$ is in the set $(-1,0,1)$, it requires two one-bit lines for feedback (illustrated as a single line). Of these lines, one carries a magnitude bit y and the other a sign bit, and the sign bit s is 1 or 0 according to whether $y_{n-1}^0$ is negative or positive respectively. The sign bit line indicated by s is extended to connect at 276 to a T' adder subcell of the least significant multiplier cell 278 in the first row. Consequently, when $s=1$ indicating that $y_{n-1}^0$ is negative, 1 is added to the least significant product digit at 2176. Similar arrangements are made for $y_{n-1}^1$ in the second row, but equivalents are omitted from subsequent rows because output digits $y_{n-1}^0$ to $y_{n-1}^3$ would not be affected thereby.

The multiplier subcells type $P^*$ are each implemented as shown in the box 272 by an EXOR gate $p_1^*$ and an AND gate $p_2^*$. The EXOR gate $p_1^*$ receives input of the sign and magnitude bits s,y of the feedback digit $y_{n-1}^m$ ($m=0$ or $-3$), and the AND gate $p_2^*$ receives input of the multiplier coefficient digit b (0 or 1) together with the EXOR gate output. Consequently, the output of a $P^*$ multiplier subcell is 1 for (s,y,b) equal to (0,1,1) and is 0 otherwise. In particular this output is 0 for (s,y,b) equal to (1,1,1) because it is required to operate the bit inversion rule of 2's complement multiplication by $-1$. Inversion is in fact achieved as illustrated in the $P^*$ cell by what amounts to EXORing the product of y and b with the sign bit s.

The outputs of most significant ($b_1^2$) multiplier subcells such as 274 pass to respective V adder subcells for addition to $u_n^2$ (first row) or to respective sum outputs from preceding rows (second to fourth rows). Each V subcell consequently receives input to a negative weight non-redundant digit $y_1$ $(-1,0)$ from above for addition to a redundant digit represented by (s,$y_2$) and in the set $(-1,0,1)$. It adds these to produce a transfer digit (s',$w_1$) in the set $(-1,0,1)$ and a sum digit $w_2$ $(-1,0)$ for output below left and vertically below respectively. Each V subcell consists of a first AND gate $v_1$, and EXNOR gate $v_2$, an EXOR gate $v_3$, and a second AND gate $v_4$. The first AND gate $v_1$ and the EXNOR gate $v_2$ receive input of the sign bit s of the redundant input digit together with the non-redundant digit $y_1$. The EXOR gate $v_3$ receives input of $y_1$ and $y_2$, whereas the second AND gate $v_4$ receives $y_2$ together with the output of EXNOR gate $v_2$. It is a straightforward matter to show that this implements the required addition, and it will not be described.

The Z adder subcell of each multiplier cell such as 278 has a similar function to a V subcell, the difference being that the non-redundant vertical input digit $y_2$ is in the digit set $(0,1)$ instead of $(-1,0)$. This has the effect that $(s,y_1) + y_2$ now has a value in the range $-1$ to 2. Consequently the output of the Z subcell is represented by a non-redundant transfer digit t in the set $(0,1)$ and a non-redundant sum digit w in the set $(-1,0)$; i.e. the additional transfer digit value of $-1$ needed in the V subcell is not required. The result of this simplification is that the Z subcell employs fewer gates, a NOR gate $z_1$, an EXOR gate $z_2$ and a second NOR gate $z_3$. The gates $z_1$ and $z_2$ both receive input of the redundant magnitude bit $y_1$ and the non-redundant bit $y_2$, and the second NOR gate $z_3$ receives the redundant sign bit s and the output of $z_1$. The second NOR gate output provides the transfer digit t, and the EXOR gate $z_2$ furnishes the sum bit w. Here again it is easily verifiable that the illustrated gate structure implements the required arithmetic function.

The multiplier cells such as 274 and 276 terminate with T' adder subcells, these being identical in digital logic terms to T cells previously described. The only difference between T and T' cells is that the digit sets of the inputs are exchanged, which leaves their functions and outputs unaltered.

In overall terms, the major difference between the form of the processor 270 and the processor 200 of FIG. 10A is that the restriction to a 2's complement multiplier coefficient $b_1^2 b_1^3 b_1^4 b_1^5$ reduces the length of the addition operation in the multiplier cells 274 etc. In particular, only two adder subcells (V-T' or Z-T') are required, as opposed to three previously (Q-R-T). Moreover, the multiplier subcell cannot produce a transfer digit, and the adder subcells only produce one transfer digit between them as opposed to two previously. This reduces the accumulation requirements, and dispenses with the need for a T accumulator subcell in consequence. In respects other than mentioned above, the processor 270 operates in the same manner as the processor 200, and will not be described further.

The examples of the invention hereinbefore described with reference to FIGS. 1 to 12C have been designed to avoid the use of pipelining latches between adjacent cells in each row in order to reduce delays within the feedback or recursion loop. In consequence, latches are employed between rows but not along them. In principle, the invention might employ the so-called "ripple-carry" architecture of the prior art for the purposes of multiplier cell design. This architecture involves propagation of transfer digits (carry bits) along the length of each row. Consequently, the latches are clocked at intervals longer than the settling time of a row, which leads to a slow operating rate. The embodiments of the invention described above have been designed to reduce the row settling time by arranging the cell structures and arithmetic functions to provide for a transfer digit generated at one point in the progress of calculation to be required for input later in the calculation. Thus for example in the processor 270, a transfer digit output from a Z subcell in the second stage of the multiply-add-add function is not required for input until the third stage of calculation in the T' subcell of the associated left hand row neighbour; i.e. the transfer digit output is computed earlier than the sum digit output. In consequence, the settling time of the multiply-add-add function is virtually that of one cell, to which must be added the settling time of the Q-R-T accumulating means. It should be noted from this that the settling time of the rows in the processor 270 (and in earlier examples) is independent of row length. Recursive filters may be required in which the coefficient $b_1$ has thirty-two or more digits, in which case the row settling time would be substantial (along the entire row) for a ripple-carry architecture but much shorter for an architecture base on FIG. 12.

Figure 13A:
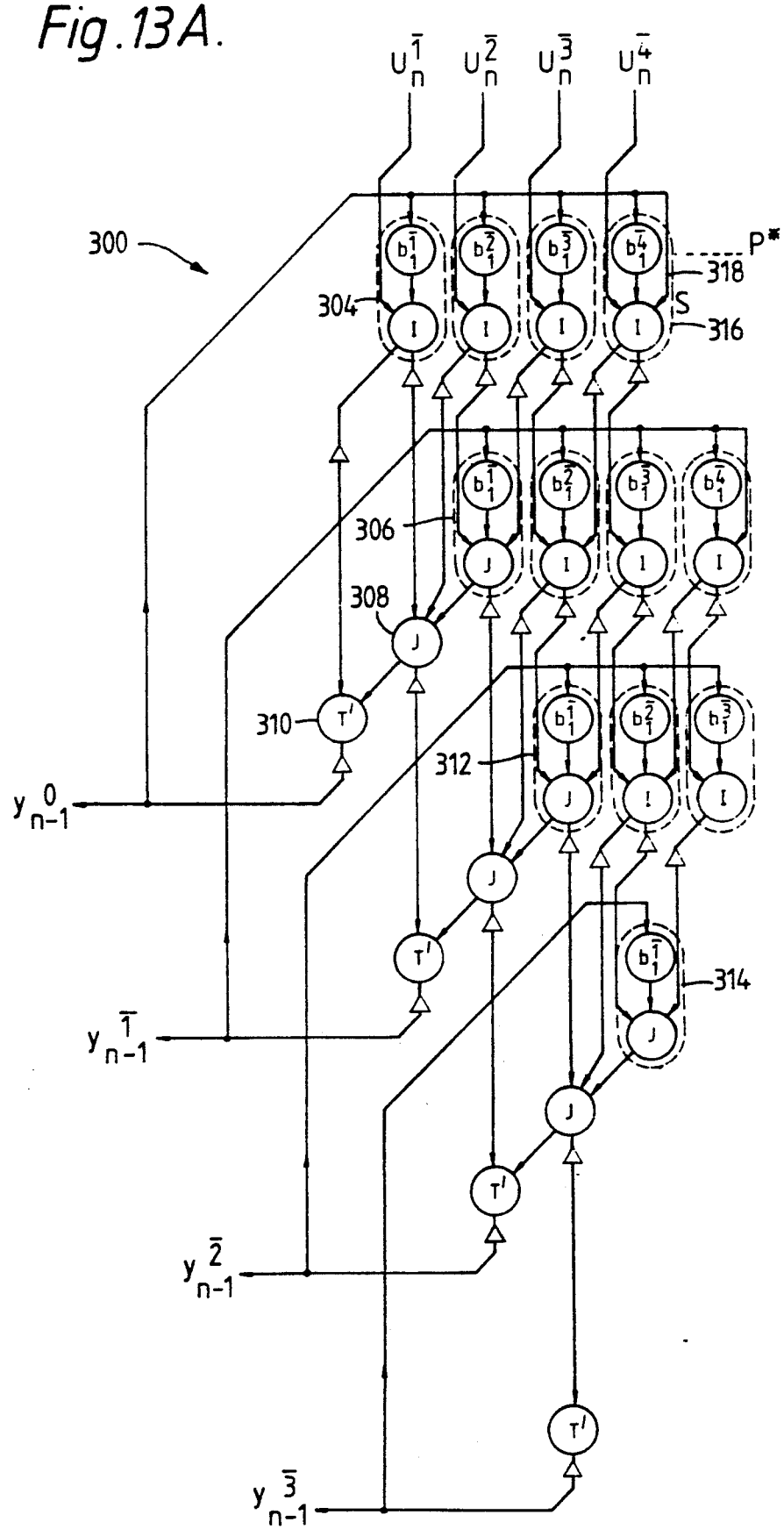
FIG. 13A illustrates a further processor of the invention arranged for non-redundant arithmetic multiplication.
Figure 13B:
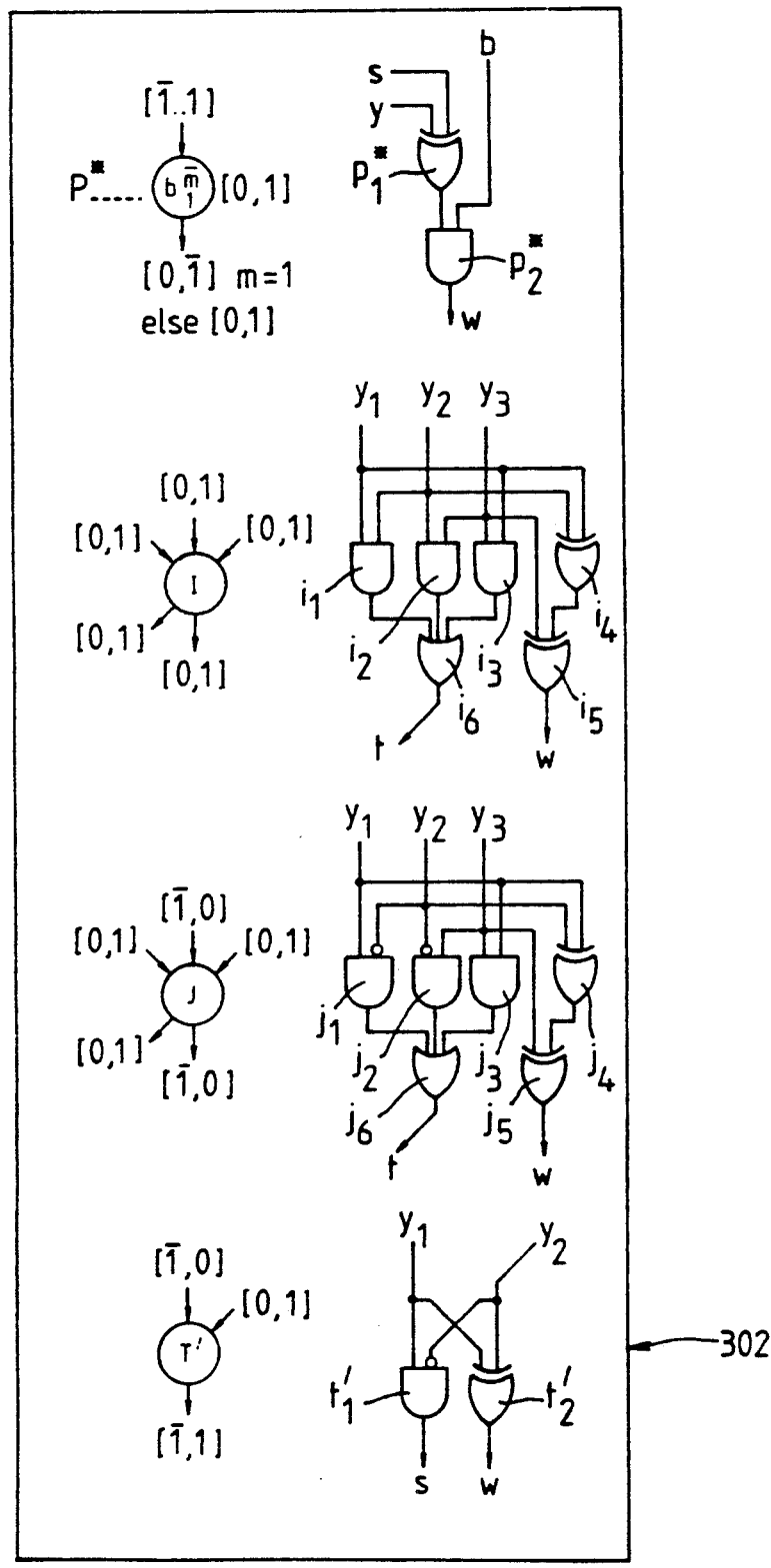
FIG. 13B shows cell functions and logic circuits for the processor of FIG. 13A.

Referring now to FIGS. 13A and 13B, there is shown a further processor 300 of the invention with cell functions and logic circuits being illustrated in a box 302. It is modified from those of FIGS. 10A and 12A to increase the use of non-redundant arithmetic circuitry and reduce cell settling times. The processor 300 is arranged to operated with redundant digits $y_{n-1}{}^0$ to $y_{n-1}{}^3$ and a two's complement coefficient $b_1$ as before, but now the non-recursive term $u_n$ is also in two's complement and therefore non-redundant form. This restriction on the form of $u_n$ has the effect of reducing the number of addition stages required in both the multiplier cells such as 304 (first row) and 306 (second row) and the accumulating means such as cells 308 and 310 (types J and T') in the second row.

The processor 300 has the further modification (as compared to earlier embodiments) that transfer digits generated in all but the most significant ($b_1{}^1$) multiplier cells in the second to fourth rows are passed to the multiplier or accumulator cell in the row below (neighbouring column). In each case, like sum output digits, the transfer digits are latched between rows as indicated by $\Delta$ symbols, the latches being synchronously clock activated as before.

The multiplier cells such as 304 and 306 each incorporated a type P* multiplier subcell (as previously described) together with an adder or subtractor subcell type $-I$, I or J. The type $-I$ subcell is electronically identical to a type I subcell. Both are full binary adders as illustrated in the box 302 with reference I, the difference being that inputs and outputs are treated as all negative in the former and all positive in the latter. The J subcell is a binary full subtractor having two positively weighted inputs and one negatively weighted input. The $-I$ subcell is employed only in the first row, second column multiplier cell 304 associated with the most significant non-recursive input digit $u_n{}^{\bar{1}}$ and most significant coefficient digit $b_1{}^{\bar{1}}$. The second, third and fourth rows have most significant multiplier cells 306, 312 and 314 containing J subtractor subcells. All other multiplier cells such as 316 at the end of the first row incorporated I adder subcells.

As in earlier embodiments, each row of the processor 300 is arranged to multiply a respective redundant feedback digit $y_{n-1}{}^m$ ($m=0$, $-1$, $-2$ or $-3$) having values ($-1$, 0 or 1) by the two's complement coefficient $b_1$ having digits $b_1{}^{\bar{1}}$ to $b_1{}^4$, and from which digits of lower significance are omitted in the third and fourth rows. The two's complement multiplication is implemented by P* type multiplier subcells as previously described. It yields a negatively weighted output product digit (0 or $-1$) from each most significant multiplier subcell P* associated with coefficient digit $b_1{}^{\bar{1}}$, and a positively weighted output product digit from each of the other multiplier subcells. The P* subcells are arranged to implement the inversion operation in the two's complement "invert and add one" rule when the corresponding $y_{n-1}{}^m$ digit if $-1$ as previously described. The "add one" operation ($s=1$) is implemented by connections such as 318 to least significant adder subcells.

The $-I$ adder subcell of first row, second column cell 304 receives a negatively weighted binary digit ($-1$ or 0) from its associated multiplier subcell P*. It also receives the most significant digit $u_n{}^{\bar{1}}$ of the non-recursive input $u_n$, which has a negative weight since $u_n$ is in two's complement form. The first row I subcells associated with coefficient digits $b_1{}^2$ to $b_1{}^4$ receive all positive inputs. This is because digits other than $u_n{}^{\bar{1}}$ and $b_1{}^{\bar{1}}$ are positive in two's complement notation, and because $y_{n-1}{}^0$ when negative is accommodated as previously described by digit inversion/add 1 rather than digit sign change.

Consequently, the most significant first row adder subcell $-I$ receives two negatively weighted input digits ($-1$ or 0), and adds these to produce binary sum and transfer digits w and t (0,1) which are therefore also negatively weighted. First row adder subcells I of lesser significance associated with $b_1{}^2$ to $b_1{}^4$ receive two or three input binary digits (0 or 1) of positive weight, and they add these to produce output sum and transfer digits w and t which are also positive. The sum and transfer digits are passed down via respective clocked latches $\Delta$ to the column neighbour below and to its right hand row neighbour (multiplier or accumulator cell as appropriate) respectively.

The first row $-I$ subcell outputs w and t to provide respective negative vertical inputs to the J and T' cells 308/310 of the second row accumulating means.

The second row multiplier cells 306 etc. operate in a like manner to first row equivalents, except that the most significant adder subcell type J (in cell 306) receives two positively weighted binary input digits from the row above together with a negatively weighted binary digit from its associated multiplier subcell type P*. It therefore receives three digits each in the non-redundant binary set (0,1) one of which is negatively weighted. It consequently produces an output in the range (2 to $-1$), which is represents as a binary transfer digit t (0,1) and a sum digit w in the negative binary set ($-1,0$). The values (2;1;0;$-1$) are represented by (t,w) of (1,0;1,1;0,0;0,1) respectively. The t and w digits are passed to the two adjacent J accumulator cells, i.e. to the left hand row neighbour and the column neighbour below respectively. The w digit passes via a latch $\Delta$.

The second row J accumulator cell 308 receives input of the negatively weighted sum digit output one cycle earlier by its column neighbour cell 304 above, together with the positively weighted transfer digits from its right hand row neighbour and from the cell above the latter (generated on the previous clock cycle). It therefore produces a positive output transfer digit t and a negative sum digit w as previously described, and these pass respectively to its row neighbour T' type accumulator cell on its left and to its column neighbour T' accumulator cell below. The second row T' accumulator cell also receives the transfer digit output on the previous latch clock cycle by the first row $-I$ subcell. The T' cell subtracts its two inputs to produce and output digit in the set ($-1,0,1$), which provides the highest significance output digit $y_n{}^0$ in the redundant set ($-1,0,1$).

The foregoing analysis indicates the formation of $y_n{}^0$. Other digits $y_n{}^m$ ($m=-1$, $-2$ and $-3$) are formed similarly $-m$ clock cycles later in a manner akin to that described for earlier embodiments.

The multiplier cells such as 304 and 306 require only one adder or subtractor subcell (type I or J) because transfer digits are added to the row below. Moreover, these subcells are simply conventional (non-redundant) binary full adders or subtractors rather than more complex devices because of the restriction to two's complement non-recursive inputs $u_n$. Some of the I subcells lack a third input, and therefore may be implemented as half adders. It may be more convenient however to implement them as full adders with one input set to zero.

Referring now to the detailed implementation of the cells of the processor 300, these appear in the box 302 as has been mentioned. Multiplier subcells P* and T' cells or subcells are as previously described in relation to FIGS. 12A and 12B. I subcells consist of three AND gates $i_1$ to $i_3$, two EXOR gates $i_4$ and $i_5$, and an OR gate $i_6$. The three binary input digits $y_1$ and $y_3$ are ANDed in pairs by the gates $i_1$ to $i_3$, the outputs of which are applied to the OR gate $i_6$. The effect is that a transfer digit t of 1 appears at the output of $i_6$ if any two or all three of input digits $y_1$ to $y_3$ are 1, and t=0 otherwise. The EXOR gate $i_4$ receives input of $y_1$ and $y_2$, and the EXOR gate $i_5$ receives the output of $i_4$ together with $y_3$. The effect of this is that the sum digit w output from $i_5$ is 1 if any one or all three of $y_1$ to $y_3$ are 1, and is 0 if any two of $y_1$ to $y_3$ are 0.

The J cell and subcell are very similar to the I subcell, the only difference being that the negatively weighted binary input digit $y_2$ is applied to inputs of AND gates $j_1$ and $j_2$ which are inverting. The effect of this is that a transfer digit output of t=1 is obtained from an OR gate $j_6$ whenever $y_1$ and $y_3$ are both 1 and whenever either of these is 1 and $y_2$ is 0. EXOR gates $j_4$ and $j_5$ provide for a sum output digit w of 1 (with negative weight) under the same circumstances as in the I cell previously described. This provides an "enthusiastic transfer" device in which inter alia an aggregate sum output of 1 is represented by digits t=1, w=1, i.e. +2−1.

The processor 300 incorporates rows of multiplier cells which are adapted from the prior art carry-save structure. The multiplier cells such as 304 and 306 operate in accordance with non-redundant binary arithmetic. The accumulating means (cells J and T') operates in accordance with redundant arithmetic, in this case a signed binary number representation arithmetic. Redundant accumulation is employed in order to provide output of $y_{n-1}^0$ etc most significant digit (msd) first and thereafter in descending order of significance. However, it is possible to employ other forms of accumulation arithmetic so long as the msd first-descending significance order format is achieved. Further details of redundant arithmetic schemes are described by A. Avizienis in "Signed-digit Number Representations for Fast Parallel Arithmetic", IRE Trans. Computers Vol. EC-10, pp. 389–400, September 1961.

Figure 14A:
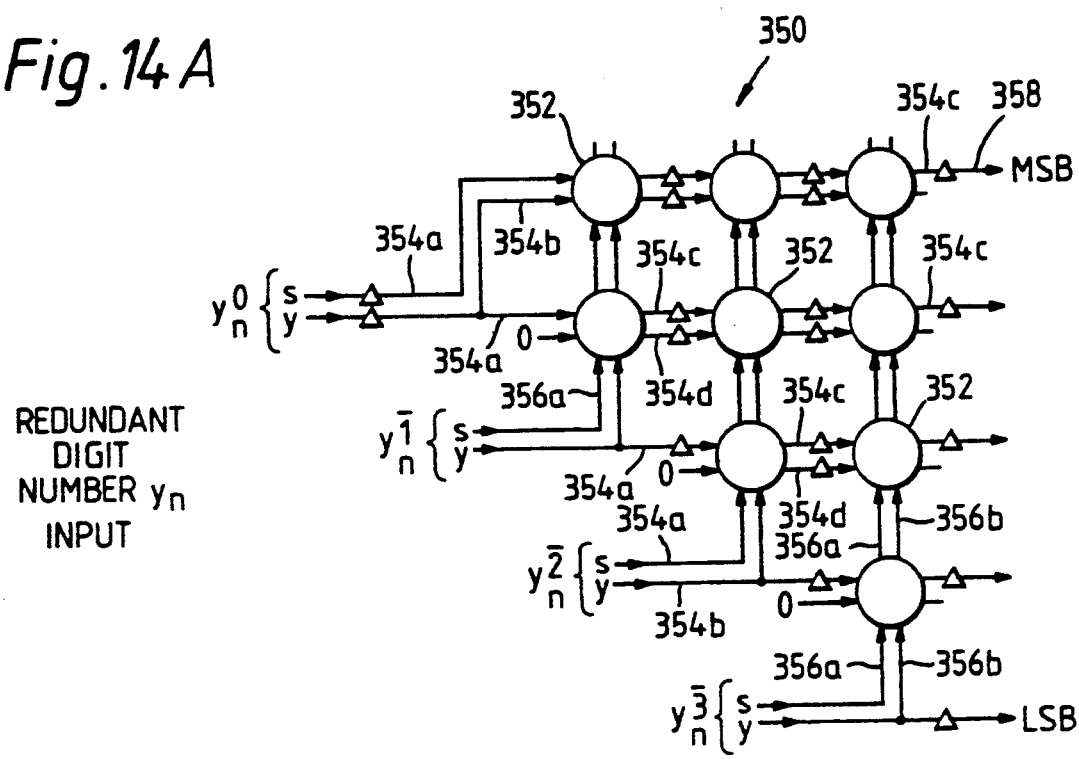
FIGS. 14$a$ and 14$b$ are a schematic drawing of a circuit for conversion of redundant binary numbers to two's complement form.

Referring now to FIG. 14a, there is shown a converter circuit 350 for converting values $y_n$ obtained in signed binary number representations (SBNRs) to conventional two's complement format (negatively weighted most significant bit (msb), other bits positively weighted). The circuit accepts digits $y_n^0$ to $y_n^3$ each in the set (−1,0,1) and each represented by a sign bit s and a magnitude bit y. The converter circuit 350 comprises a generally triangular array of cells 352 connected to form rows and columns. Intercell connections are pairs of horizontal and vertical lines such as 354 and 356 carrying bits s and y respectively. Clock activated latches Δ appear in horizontal lines 354 between pairs of cells 352, and also at outputs such as 358 from the rightmost column of cells 352.

Figure 14B:
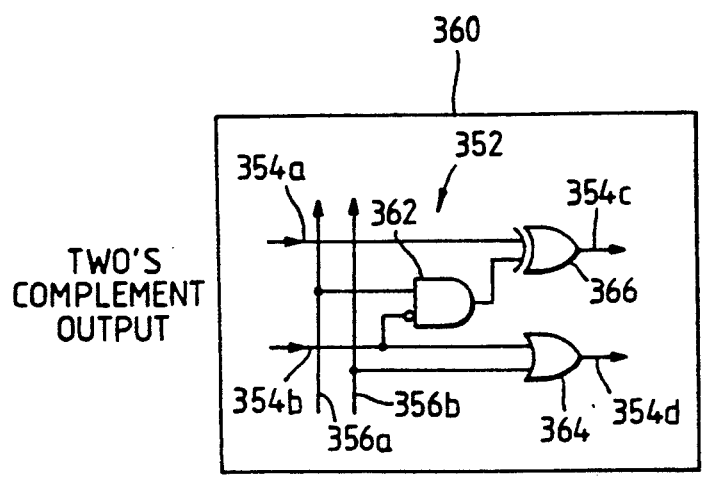

Each cell 352 is illustrated in more detail in a box 360 in FIG. 14b. It comprises an AND gate 362 having one inverting input, an OR gate 364 and an EXOR gate 366. A horizontal upper input line 354a is connected to the EXOR gate 366. A lower input line 354b is connected to the OR gate 364 and to the inverting input of the AND gate 362. Left and right hand vertical lines 356a and 356b provide second inputs to the AND gate 362 and the OR gate 364 respectively, and these lines pass upwards for connection to column neighbours where available. The cell output is provided by upper and lower lines 354c and 354d connected respectively to the EXOR gate and OR gate outputs.

The magnitude digit y of the mth input digit $y_n^{\overline{m}}$ (m=0 to 3) is connected as an upper row input to the line 354a of the respective first (leftmost) cell 352 in the (m+2)th row. This digit of $y_n^0$ is also connected to the lower input 354b of the first cell in the first row. The like digits of $y_n^1$ to $y_n^3$ are also connected to the right hand column inputs on line 356b of the first, second and third columns respectively. The sign digits s of $y_n^1$ to $y_n^3$ provide left hand column inputs on lines 356a to the first to third columns respectively. The sign digit of $y_n^0$ provides an upper row input on line 354a to the first cell of the first row.

Outputs on lines 354c/354d pass between row neighbour cells 352. The circuit output is provided by the upper lines 354c of the last (rightmost) column of cells 352, together with the magnitude bit y of the least significant digit $y_n^3$ of the input $y_n$. The output is in two's complement form, and the bits thereof are in descending order of significance beginning with the most significant bit (msb) from the first (uppermost) cell 352 and ending with the least significant bit (lsb) on the lowermost line. It is straightforward matter for those skilled in the art of electronics to verify that the structure illustrated converts redundant binary numbers to (non-redundant) two's complement form, and this will not be described. The structure illustrated also extends naturally to $y_n$ of larger numbers of digits by provision of additional rows and columns of cells 352. It also conveniently converts a temporally skewed $y_n$ input to a deskewed or synchronous output.

We claim:

1. A processor for calculating results from computations involving multiplying input data words composed of input data digits by a coefficient word including a higher significance part, said coefficient word composed of coefficient digits, the processor including:

(a) an array of multiplier cells, said cells forming rows and columns, each cell comprising a means for multiplying an input digit by an individual one of said coefficient digits, said multiplier cells comprising a means for implementing radix 2 arithmetic;

(b) a respective common input connection means for each row arranged for supplying to said row a respective input data digit for multiplication by each multiplier cell in that row, each row being arranged to multiply such input data digit by at least said higher significance part of said coefficient word and for producing sum and transfer digits;

(c) column interconnection line means for connecting pairs of adjacent columns for passing transfer digits therebetween to enable addition of sum and transfer digits of like digit significance arising from multiplication in neighboring columns where available; and (d) accumulating means for adding together digits produced in multiplier cells which are in neighboring pairs of rows and which correspond with coefficient digits of highest significance, the accumulating means comprising means for computing digits of said results, most significant digit first and in descending order of digit significance in accordance with a redundant arithmetic scheme, said accumulating means further comprises:

a plurality of adding means, each of said adding means corresponds with a respective row and comprises means for addition of said respective row's highest digit significance output with at least three digits of significance at least equal therewith generated in a respective preceding row where available, and for producing from each said addition a digit of a respective results, which digit is of redundant binary form and is of a digit significance corresponding to the respective row.

2. A processor according to claim 1 wherein each said adding means includes means for receiving from a corresponding row a highest digit significance output comprising two digits.

3. A processor according to claim 2 wherein said multiplier cells and adding means include means for receiving redundant binary inputs and for generating redundant binary outputs.

4. A processor according to claim 3 wherein the multiplier cells comprise multiplier subcells, each of said subcells incorporating an EXOR gate and first and second AND gates, the EXOR gate is connected to receive sign bits of both an input data digit and a coefficient digit, the first AND gate is connected to receive magnitude bits of both the input data digit and the coefficient digit and to output therefrom an intermediate product magnitude bit, and the second AND gate is connected to receive output bits from both the EXOR gate and the first AND gate and to output therefrom an intermediate product sign bit.

5. A processor according to claim 3 wherein the multiplier cells of a first row of the array comprise multiplier subcells each of said multiplier subcells comprising a means for multiplication but do not comprise means for adding transfer digits.

6. A processor according to claim 1 wherein each array row has multiplier cells, said multiplier cells comprising means for receiving a respective common input data digit comprising a magnitude bit and a sign bit, said multiplier cells further comprising multiplier subcells each subcell comprising means for multiplying an input data magnitude bit by a respective non-redundant binary coefficient digit, a first row multiplier subcell, corresponding to a coefficient digit of highest significance, comprising a means for providing a negatively weighted output, and other first row multiplier subcells comprise a means for providing positively weighted outputs, where at least a row corresponding to an input data digit of highest significance has a multiplier cell corresponding to a coefficient digit of least significance and comprises a means for adding an input sign bit to respective multiplier subcell output products.

7. A processor for calculating results from computations involving multiplying input data words composed of input data digits by a coefficient word including a higher significance part, said coefficient word composed of coefficient digits, the processor including:

(a) an array of multiplier cells, said cells forming rows and columns, each cell comprising a means for multiplying an input digit by an individual one of said coefficient digits, said multiplier cells comprising a means for implementing radix 2 arithmetic, said array has a first row arranged to receive highest significance input data digits, and each multiplier cell in said first row is arranged to pass output sum and transfer digits to a neighboring second row of said array, each multiplier cell which is not in said first row of the array and which corresponds to a coefficient digit of highest significance comprises a means for providing transfer output to the respective adding means corresponds to said multiplier cell's respective row and for providing sum digit output to a succeeding row where available, each multiplier cell which is not in said first row of the array and which corresponds to a coefficient digit of less than highest significance is connected to a succeeding row and comprises means for passing output sum and transfer digits to said succeeding row;

(b) a respective common input connection means for each row arranged for supplying to said row a respective input data digit for multiplication by each multiplier cell in that row, each row being arranged to multiply such input data digit by at least said higher significance part of said coefficient word and for producing sum and transfer digits;

(c) column interconnection line means for connecting pairs of adjacent columns for passing transfer digits therebetween to enable addition of sum and transfer digits of like digit significance arising from multiplication in neighboring columns where available, and (d) accumulating means for adding together digits produced in multiplier cells which are in neighboring pairs of rows and which corresponds to coefficient digits of highest significance, the accumulating means comprising means for computing digits of said results, most significant digit first and in descending order of digit significance in accordance with a redundant arithmetic scheme, said accumulating means comprises:

a plurality of adding means, and each of said adding means corresponds to a respective array row other than said first row and comprises means for addition of said respective row's highest digit significance output with digits of significance at least equal therewith generated in the respective preceding row, and for producing from each said addition a digit of a respective one of said results, which digit is of redundant binary form and is of a digit significance corresponding to the respective row.

8. A processor according to claim 7 wherein each array row has multiplier cells connected to receive a respective common data input comprising a magnitude bit and a sign bit, the multiplier cells comprise multiplier subcells, each of said multiplier subcells comprising means for multiplying an input data magnitude bit by a respective non-redundant coefficient binary digit, a first row most significant multiplier subcell comprises a means for providing a negatively weighted output and other multiplier subcells comprise means for providing positively weighted outputs, and at least those rows which correspond to output digits of higher significance have least significant multiplier cells arranged to add an input data sign bit to respective multiplier subcell output products.

9. A processor according to claim 7 wherein said multiplier cells comprise multiplier subcells each incorporating an EXOR gate and an AND gate, the EXOR gate is connected to receive sign and magnitude bits of a redundant binary input data digit, the AND gate is connected to receive an output bit from the EXOR gate and a binary coefficient bit and the AND gate comprises a means for computing an intermediate product bit.

10. A processor for calculating results from computations involving multiplying input data words composed of input data digits by a coefficient word including a higher significance part, said coefficient word composed of coefficient digits, the processor including:

(a) an array of multiplier cells, said cells forming rows and columns, each cell comprising a means for multiplying an input digit by an individual one of said coefficient digits, said multiplier cells comprising a means for implementing radix 2 arithmetic, the array has a first row of multiplier cells responsive to highest significance input data digits, said multiplier cells are responsive to input data digits in redundant binary form, and comprise means for passing to respective succeeding rows where available all sum and transfer digits other than highest significance transfer digits output to the accumulating means from rows of the array other than said first row, those of the multiplier cells which form said first row are responsive to a respective subsidiary input digit of each subsidiary input word in non-redundant binary form, and comprise a means for performing one of, according to sign, addition and subtraction, involving a respective subsidiary input digit and an intermediate product resulting from multiplication of an input data digit by a coefficient digit;

(b) a respective common input connection means for each row arranged for supplying to said row a respective input data digit for multiplication by each multiplier cell in that row, each row being arranged to multiply such input data digit by at least said higher significance part of said coefficient word and for producing sum and transfer digits;

(c) column interconnection line means for connecting pairs of adjacent columns for passing transfer digits therebetween to enable addition of sum and transfer digits of like digit significance arising from multiplication in neighboring columns where available, and (d) accumulating means for adding together digits produced in multiplier cells which are in neighboring pairs of rows and which correspond to coefficient digits of highest significance, the accumulating means comprising means for computing digits of said results, most significant digit first and in descending order of digit significance in accordance with a redundant arithmetic scheme, said accumulating means further comprises: a plurality of adding means, each of said adding means corresponds to a respective row other than said first row and comprises means for addition of said respective row's highest digit significance output with at least three digits of significance at least equal therewith generated in the respective preceding row where available, and for producing from each said addition a digit of a respective one of the said results, which digit is of redundant binary form and is of a digit significance corresponding to the respective row.

11. A processor according to claim 10 wherein each array row has multiplier cells connected to receive a respective common input data digit comprising an input data magnitude bit and an input data sign bit, said multiplier cells comprise multiplier subcells, each of said multiplier subcells comprising means for multiplying an input data magnitude bit by a respective non-redundant binary coefficient digit, a first row most significant multiplier subcell comprises a means for providing a negatively weighted output and other multiplier subcells comprise means for providing positively weighted outputs, and at least those rows which correspond to result digits of higher significance have least significant multiplier cells comprising means for adding an input data sign bit to respective multiplier subcell outputs.

12. A processor according to claim 10 wherein said multiplier cells comprise multiplier subcells each incorporating an EXOR gate and an AND gate, the EXOR gate is connected to receive sign and magnitude bits of a redundant binary input data digit, the AND gate is connected to receive an output bit from the EXOR gate and a binary coefficient bit and the AND gate comprises a means for computing an intermediate product bit.

13. A processor according to claim 12 wherein:

(a) multiplier cells which are not in said first row of the array and which correspond to most significant coefficient digits incorporate full subtracter subcells, each subcell comprising means for subtracting said intermediate product digit produced by a respective multiplier subcell from at least one non-multiplicand input digit comprising at least one of a subsidiary input digit, a preceding row multiplier cell output sum digit and a preceding row multiplier cell output transfer digit, (b) multiplier cells which are in said first row and multiplier cells which are not in said first row but which correspond to coefficient digits of lesser significance incorporate full adder subcells, each comprising means for adding said intermediate product digit produced by a respective multiplier subcell to at least one non-multiplicand input digit comprising at least one of a subsidiary input digit, a preceding row multiplier cell output sum digit, a preceding row multiplier cell output transfer digit and an input data sign bit, and (c) said full subtracter subcells and said full adder subcells comprise means for inputting and outputting non-redundant binary digits.

* * * * *

UNITED STATES PATENT AND TRADEMARK OFFICE
CERTIFICATE OF CORRECTION

PATENT NO. : 5,243,551

DATED : September 7, 1993

INVENTOR(S) : Simon C. KNOWLES et al.

It is certified that error appears in the above-identified patent and that said Letters Patent is hereby corrected as shown below:

```
Claim 1, col. 29, line 5,  change "with" to --to--;
                 line 13, change "with" to --to--;
                 line 19, change "results," to --result,--.

Claim 2, col. 29, line 25, before "corresponding" insert --respective--.

Claim 7, col. 30, line 17, change "corresponds" to --corresponding--;
                 line 41, change "corresponds" to --correspond--.
```

Signed and Sealed this

Tenth Day of May, 1994

Attest:

BRUCE LEHMAN

Attesting Officer

Commissioner of Patents and Trademarks